United States Patent Office

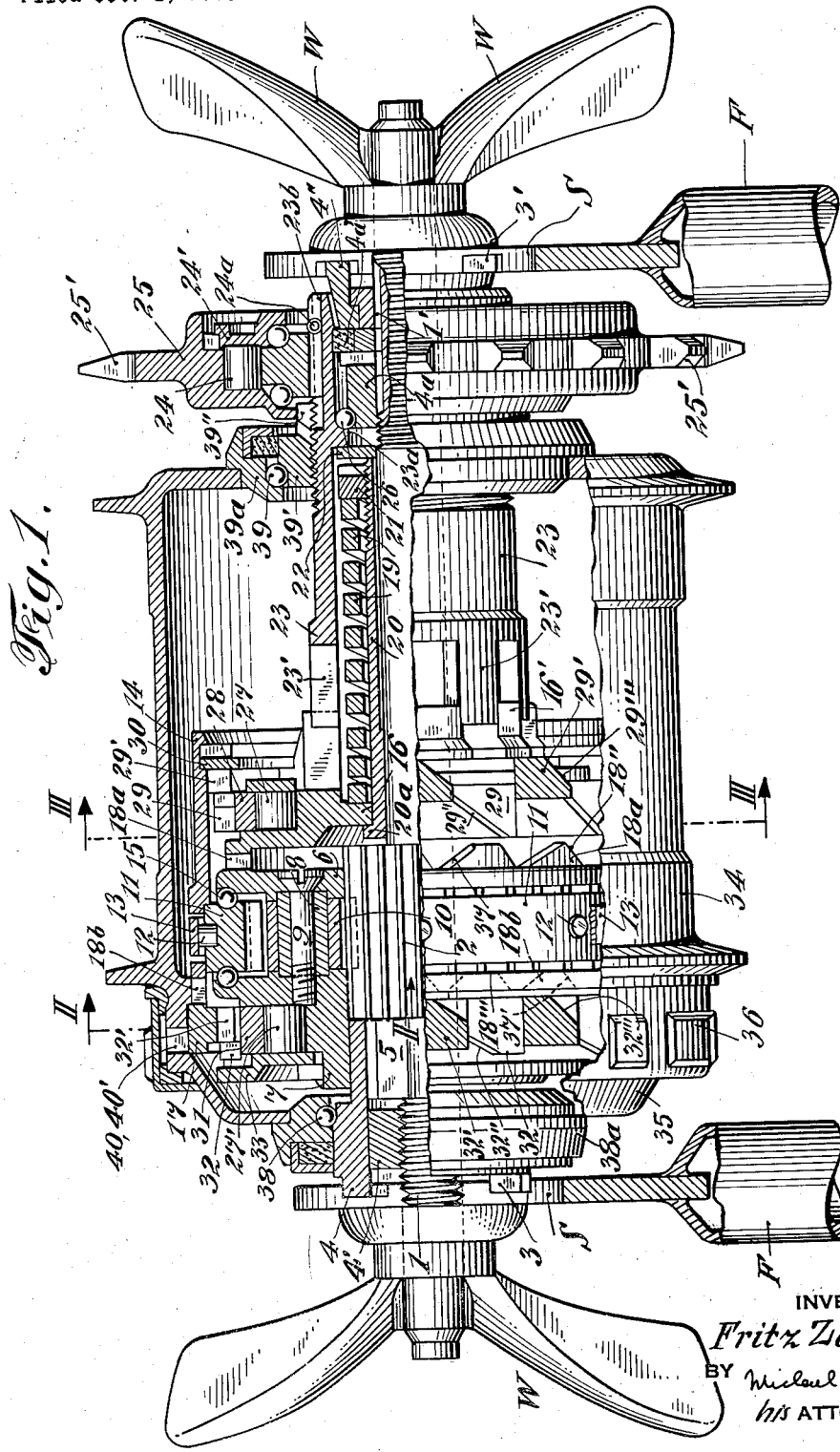

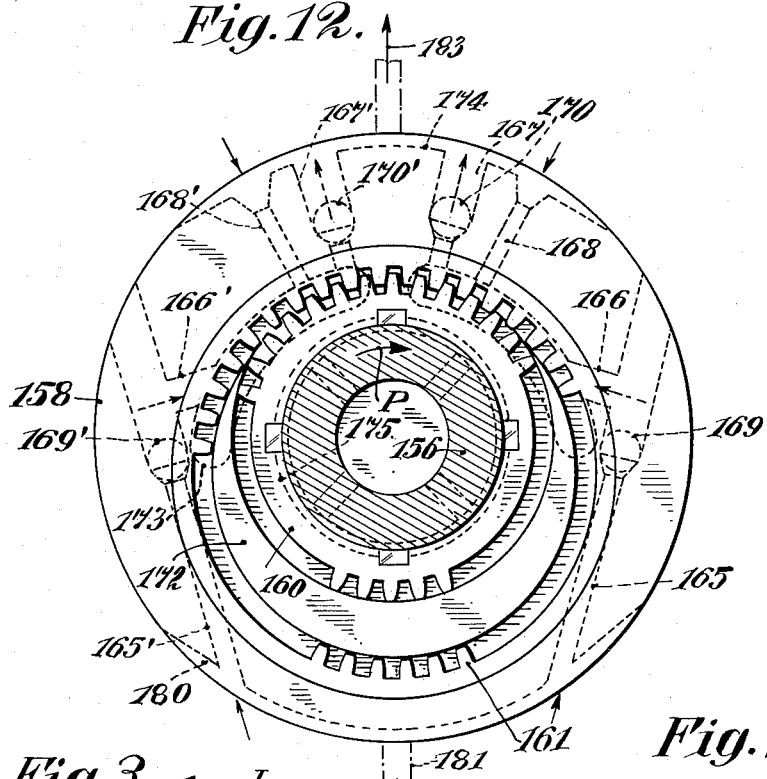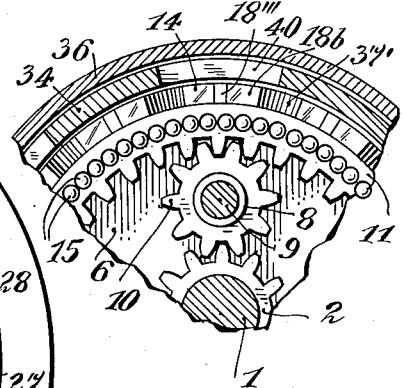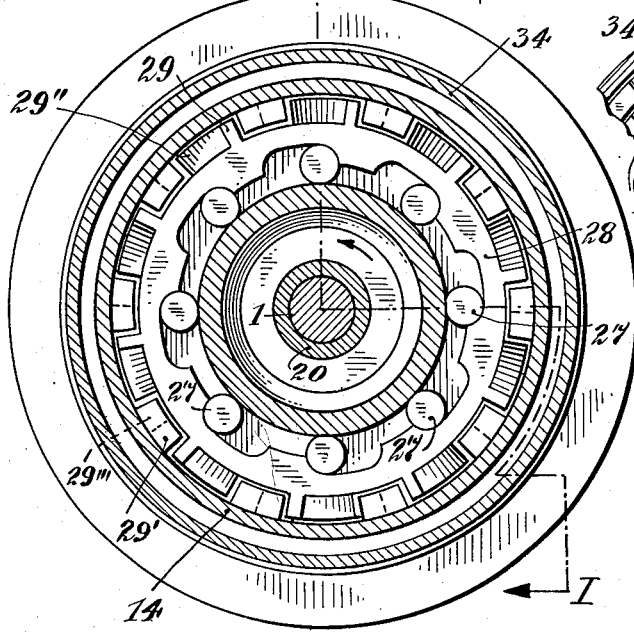

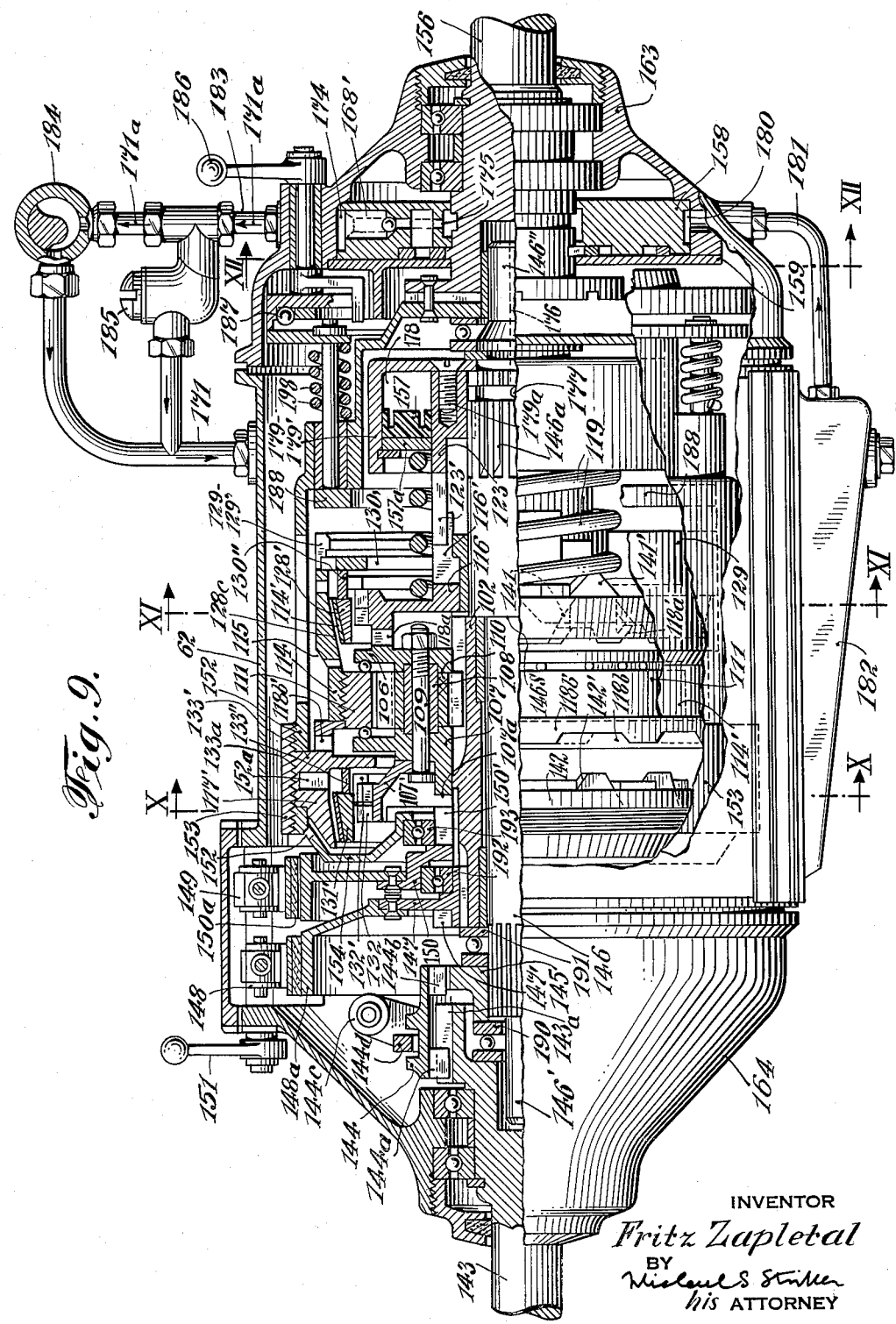

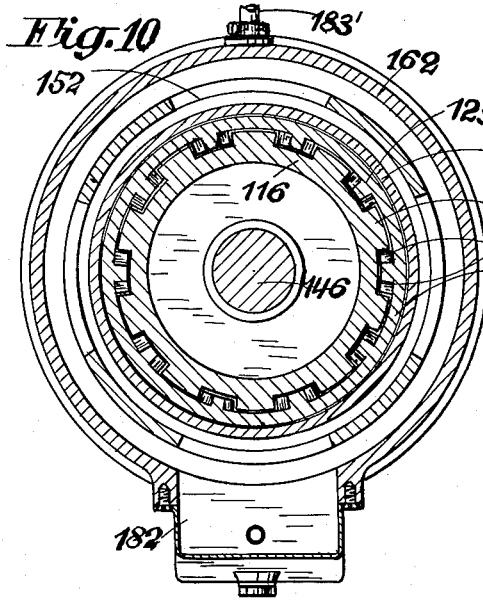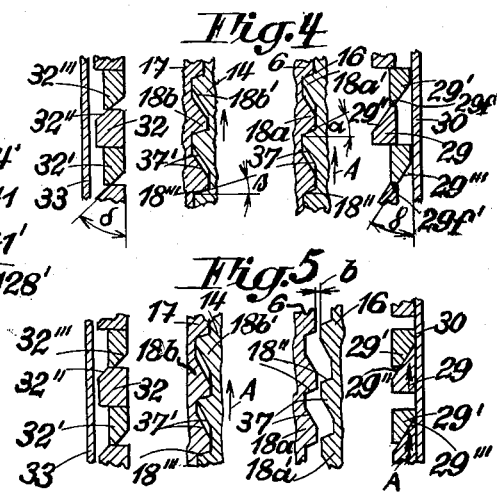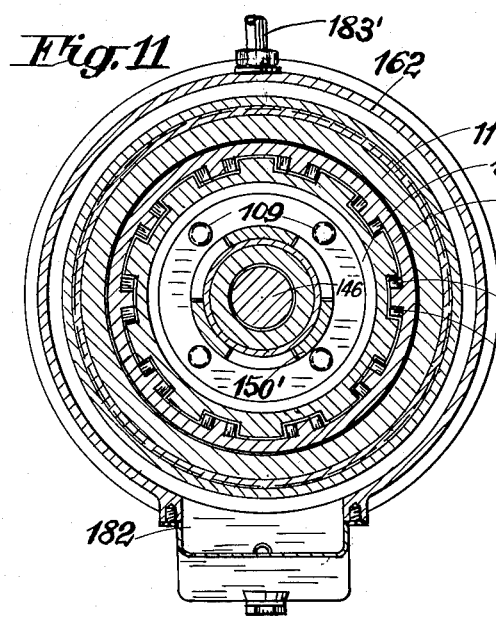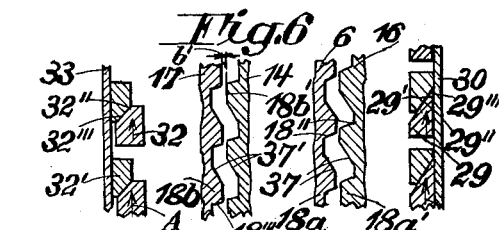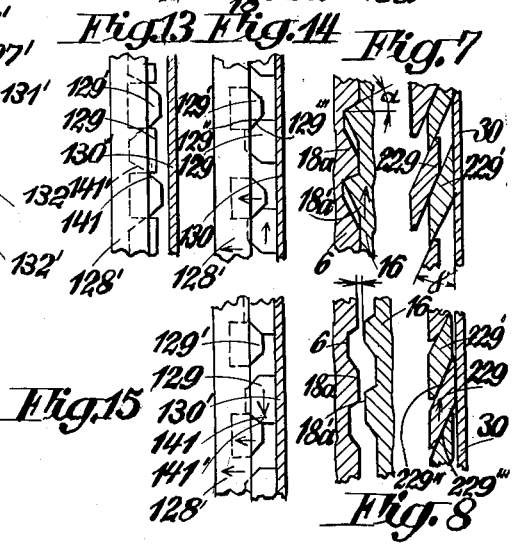

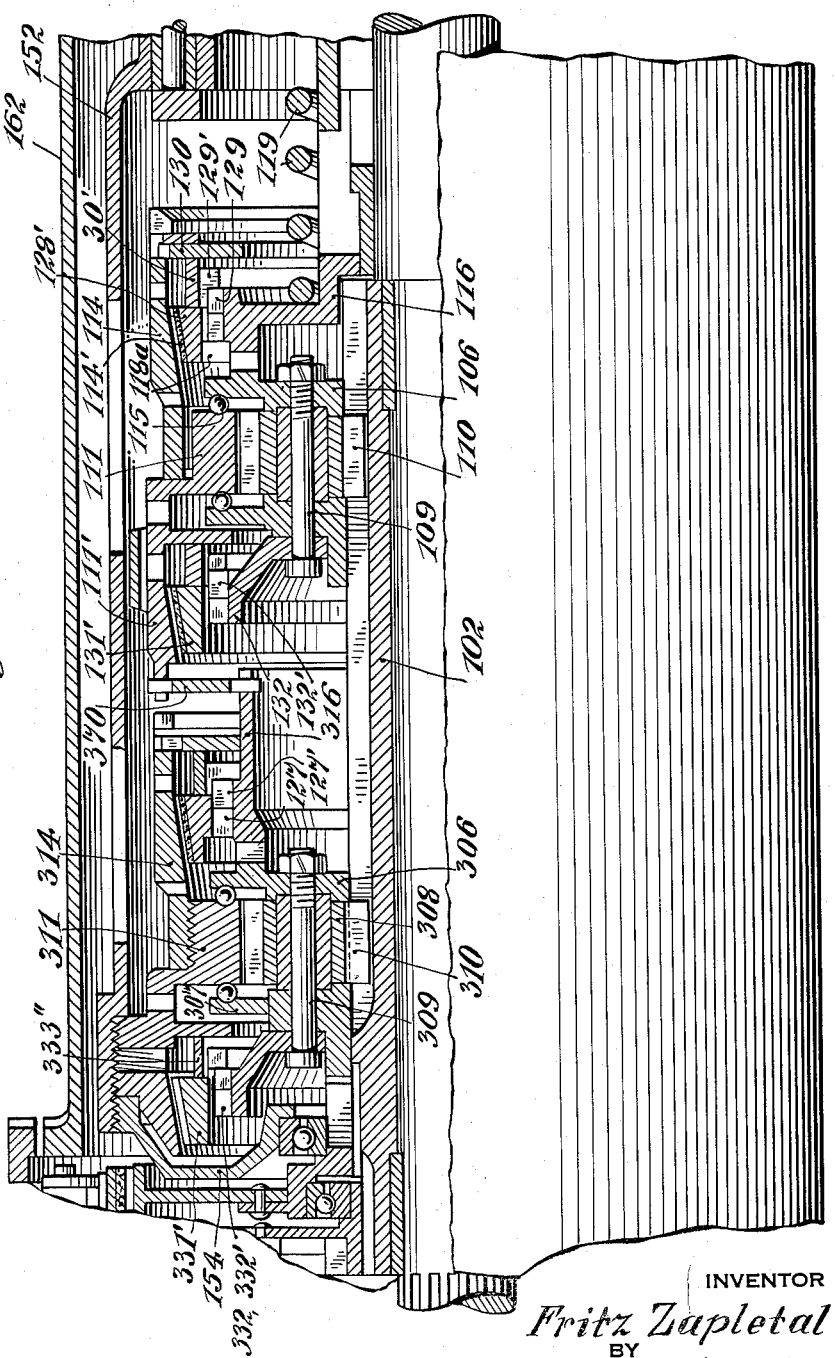

2,982,154
Patented May 2, 1961

2,982,154
AUTOMATIC TRANSMISSIONS

Fritz K. Zapletal, Vienna, Austria, assignor to Gyromatic Getriebe-Gesellschaft m.b.H., Vienna, Austria Filed Oct. 1, 1958, Ser. No. 764,649

Claims priority, application Austria February 24, 1958

44 Claims. (Cl. 74—751)

The present invention relates to transmissions in general, and more particularly to variable speed and torque transmissions for bicycles, motor driven conveyances and analogous uses.

Automatic transmissions of known design utilize electromagnetic or hydrodynamic clutch assemblies for selectively connecting various component parts in a manner to change the speed ratio between the driven and driving elements of the device. A drawback particularly felt in hydraulic clutch assemblies is in that they operate with a certain degree of slippage which reduces the efficiency of transmission in each of its speed ratios.

An important object of the present invention is to provide an improved variable speed and torque transmission which is practically slip-proof and thus transmits power and rotation with very great efficiency.

Another object of the invention is to provide a fully automatic variable speed transmission which is equally suitable for use in motorless as well as in motor driven conveyances.

A further object of the invention is to provide an automatic variable speed and torque transmission which operates without any hydraulic, electric or magnetic means.

An additional object of the invention is to provide a transmission of the above described characteristics which is relatively simple in construction, very reliable in operation, and which is so compact that it may be installed in the wheel hub of a bicycle, motorcycle or the like.

A concomitant object of the instant invention is to provide a transmission of the type above set forth with an operating range of three, four, five or more different drive ratios.

A still further object of the invention is to provide an automatic transmission which is equally effective for transmitting power and rotation in forward or reverse directions and which may be shifted into neutral position when the engine of a motor driven conveyance is idling.

A yet further object of my invention is to provide a novel system of releasable spring-biased clutch assemblies which remain operative within a certain range of transmitted power and release in a fully automatic way when the power and hence the angular momentum or the resistance to rotation of the driven parts increases above or drops below predetermined limits at which the shifting into a different speed ratio occurs.

A yet further object of my invention is to provide in the transmission of above described characteristics specific positively engaging clutch means of novel construction which may be utilized with equal efficiency when the parts rotate in clockwise or counterclockwise direction.

A further object of the invention is to provide a transmission of the above outlined characteristics which is so constructed that it may shift into a selected ratio either automatically or by direct action of an operator.

An additional object of the invention is to provide a transmission for bicycles and motor driven conveyances in which the changes in speed ratio occur in dependency on the magnitude of transmitted torque.

Another object of the invention is to provide a transmission which is capable of transmitting torque with uniform efficiency regardless of angular speed at which the driving and driven parts rotate.

A further object of the instant invention is to provide a transmission for motor driven or motorless vehicles which is so constructed that it will automatically change speed regardless of whether torque is transmitted from the driving or the driven side thereof.

A still further object of the invention is to provide a transmission so constructed that the range of each speed ratio may be varied by the operator, when desired and necessary.

The above and other objects of the invention are attained by the provision of an automatic change-speed transmission in which a single, two or more planet wheel assemblies are disposed serially and in coaxial relationship in such manner that the driving or input means of the transmission are selectively connectible with at least two different components of a planet wheel assembly, that is, with either two of three components comprising the sun wheel means, planet wheel carrier means and the ring gear means to transmit power and rotation of the driving means to the driven or output means in dependency on the momentary setting of the transmission. In other words, depending on which component of the planet wheel assembly or assemblies is connected with the driving means, the driven means of the transmission will revolve at an angular speed less, equal to, or greater than the angular speed of the driving means. The driven means, too, is selectively connectable with more than one component of the planet wheel assembly.

In accordance with an important feature of the invention, the change into different speed ratios is brought about by shifting means which latter operate in dependency on the momentary difference in rotational speed or torque existing between the driven and the driving means of the improved transmission, the shifting into different speed ratios being entirely automatic and occurring in response to resistance to rotation met by the driven means while driven by the driving means. The shifting means is connected for rotation with the driving means and is axially slidable with respect thereto, its axial movements being controlled by normally tensioned and preferably adjustable resilient means to selectively connect the shifting means with, or permit its disconnection from, a selected component part of the planet wheel assembly, for example, its connection with the planet wheel carrier means, in dependency on the axial component of power transmitted by the shifting means. The releasable connection between the shifting means and the selected component of the planet wheel assembly comprises spring biased toothed deflecting clutch means with the teeth of the clutch halves or boxes so arranged that they become automatically disengaged against the force of the aforementioned resilient means when the difference between the angular momentum of driven means, e.g. of a selected component of the planet wheel assembly, and of the driving means, e.g., of the shifting means, exceeds a predetermined value at which the transmission should shift into a different speed ratio.

The invention also contemplates the provision of hydraulic control means for automatically changing the tension of resilient means which latter, as above explained, controls the shifting means of the novel device. The hydraulic means thus allows for shifting into different speed ratios regardless of the difference in angular velocity and for torque of the driven and driving parts.

Still further, the number of planet wheel assemblies may be increased to two or more if it is desired to operate with more than three transmission ratios. In such instances, suitable connections are provided between the adjacent planet wheel assemblies to add at least one or two additional speed ratios for each additional planet wheel assembly and to thus contribute considerably to the versatility and greater utility of my transmission.

Yet further, and especially in motor driven vehicles, the transmission may be combined with one, two or more braking means as well as with means for reversing the direction of rotation of the driven means with respect to the direction in which the driving means is rotated. This may be attained by releasably connecting a suitable shifting device with the third component of the planet wheel assembly closest to the driving means, e.g. with the sun wheel means which latter rotates the other two components in reverse direction and hence causes the driven means to revolve in a direction counter to that of the driving means.

The transmission constructed in accordance with my present invention is the first automatic device of this character which may be applied to bicycles for shifting into different speed ratios without manual control. As above stated, the important feature of my invention is in that the transmission will shift in a fully automatic way depending on differences in angular momentum of driven and driving parts and/or in dependency of the resistance to rotation of driven means. As the tension of resilient means is readily adjustable within a desired range, the exact differences in angular momentum at which the transmission will shift into a different speed ratio may be set in advance in accordance with specific demands and depending on circumstances under which the conveyance is put to use.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawings, in which:

Fig. 1 is partly elevational and partly sectional view of one embodiment of the improved transmission shown installed in the rear wheel hub of a bicycle, the section being taken on line I—I of Fig. 3 as seen in the direction of arrows;

Fig. 2 is a fragmentary transverse section taken on line II—II of Fig. 1;

Fig. 3 is a full transverse section taken on line III—III of Fig. 1;

Fig. 4 is a developed fragmentary sectional view of four clutch assemblies forming part of the transmission shown in Fig. 1, the assemblies being shown in the position which they assume when the transmission is in high-speed gear;

Fig. 5 is a view similar to that of Fig. 4, in which one of the clutch assemblies is inoperative, this position of the assemblies corresponding to the one-to-one normal transmission of power;

Fig. 6 is a view similar to that of Fig. 4 and 5 in which two clutch assemblies are inoperative, the assemblies being in the position they assume when the transmission automatically shifts into low-speed driving gear;

Fig. 7 corresponds substantially to the right-hand half of Fig. 4, one clutch assembly being shown with slightly modified teeth;

Fig. 8 illustrates the assembly of clutches shown in Fig. 7 in the position corresponding to the one-to-one or to the low-speed transmission ratio, with one of the clutches in inoperative position;

Fig. 9 is partly sectional and partly elevational view of a different embodiment of the improved transmission which is connectable to the engine of an automotive vehicle;

Figs. 10, 11 and 12 are transverse sections taken, respectively, on lines X—X, XI—XI and XII—XII of Fig. 9, as seen in the direction of arrows;

Figs. 13, 14 and 15 are developed fragmentary and partly sectional views of a two-way clutch assembly also shown in Fig. 9, the teeth of clutch assembly being illustrated in three different positions; and Fig. 16 is a partial axial section through a further embodiment of my transmission which operates with two sets of planetary wheels and has a greater number of transmission ratios.

Referring first to the embodiment shown in Figs. 1 to 6, and more particularly to Fig. 1, there is shown an automatic transmission built into the wheel hub 34 surrounding the rear axle 1 of a bicycle. This transmission is shown as a three-speed-ratio driving gear even though as will be fully explained in connection with Fig. 16, it may comprise more ratios, if desired and necessary.

Fig. 1 illustrates in partial section and partial elevation, as seen from below, the live or input axle 1 which extends through the cutouts or slots S in the legs of back fork F, and is held in said slots by a pair of wing nuts W. Axle 1 carries two tapered sockets or cones 4, 4a adjacent to its respective ends. Cone 4 serves as the inner race for antifriction rolling elements 38 whose outer race 38a is received in the end cap 35 of wheel hub 34. The other cone 4a constitutes the inner race for rolling elements 26 whose outer race 23 at the same time acts as the driving bushing for the three-speed-ratio transmission. Cone 4 is formed with flat extensions 3 which are non-rotatably received in the slot S of the left-hand leg of fork F, and thus prevent rotation of member 4. The latter is fixed to axle 1 by means of a nut 4' and is provided with one or more elongated cutouts for reception of teeth or coupling members 5 which form part of a sun wheel 2. This sun wheel is thus non-rotatably but slidably fixed to axle 1 and abuts with its right-hand end face against a stop (not shown because hidden in member 2).

The other cone 4a is screwed onto axle 1 and is held in the position shown by means of a discoid member 4a' whose nose extends into the groove 1' provided in live axle 1. A lock nut 4", formed with flat extensions 3'. is screwed tight against member 4a' to hold the cone 4a in desired position. Extensions 3' are received in the slot of the right-hand leg of fork F.

A portion of driving bushing 23 is formed with external threads to receive a conical bearing member 39' acting as the inner race for rolling elements 39 whose outer race 39a is received in the wheel hub 34. Thus, the latter is rotatable about two bearings comprising rolling elements 38, 39 disposed about the left-hand cone 4 and driving bushing 23, respectively, the bushing 23 itself being mounted for rotation about rolling elements 26 surrounding the right-hand cone 4a. Cone 39' is provided with teeth or coupling elements 39" which engage with part 24', the latter being fixed to bushing 23 in tongue-and-groove fashion for rotation therewith. Part 24' is driven by the chain sprocket 25 over an overrunning clutch 24. Teeth 25' of sprocket 25 are in engagement with the bicycle chain (not shown). Thus, sprocket 25 and bushing 23 rotate in unison in one direction by being coupled over the overrunning clutch or free-wheel drive 24.

Within the wheel hub 34, there is provided a planet wheel carrier assembly which consists of an annular discoid member 6 and a second annular member 7 held at a constant distance from member 6 by means of bearing spacers 8. Screws 9 extend through tubular spacers 8 and rigidly connect members 6 and 7. The assembly of members 6 to 9 is freely rotatable about cone 4 and sun wheel 2. Each spacer 8 carries a rotatably mounted planet wheel 10 whose teeth mesh with sun wheel 2 on the one hand, and with a ring gear 11 on the other hand. The latter is rotatably mounted between the carriers 6, 7 in roller bearings 15 and is coaxial with power shaft or axle 1. Planet wheels 10 may be driven either by rotating carriers 6, 7 at a certain speed ratio, or by the rotating ring gear 11 at a different speed ratio. Members 6, 7 rotate at a speed which may be equal to the angular speed of driving bushing 23 and sprocket 25 or may be less, the variation in speed depending upon the transmission ratio between members 11 and 6, 7. Planetary wheels 10 travel about stationary sun wheel 2 and within the ring gear 11 so that the latter's angular speed is constantly greater than the speed of carrier assembly 6, 7, regardless of whether the carrier assembly drives ring gear 11 or vice versa. The speed ratio between carrier assembly 6, 7 and ring gear 11 may be expressed as a contant.

The periphery of ring gear 11 is connected with a sleeve 14 which latter is provided with teeth or coupling elements 29' to be described in greater detail as the description proceeds. The rigid connection between members 11 and 14 may be of any known design; it is shown in Fig. 1 as consisting of pins or bolts 12 which extend into suitably spaced bores in the periphery of ring gear 11 and into aligned bores in member 14. Pins 12 are held in their bores by a split steel ring 13.

Disc 6, forming part of the carrier assembly for planetary wheels 10, is formed with teeth 18a at its right-hand side facing away from ring gear 11, the teeth being formed with deflecting surfaces 18" (see Fig. 4) which enclose a certain angle $\alpha$ with the plane passing through the axis of member 1. Teeth 18a mesh with similar teeth 18a' formed integrally with a shifting member 16 of substantially discoid shape which is rotatably mounted on a sleeve 20 with the latter mounted directly on axle 1. Sleeve 20 has an end flange 20a which limits the movements of shifting member 16 toward the planet carrier 6. Shifting member 16 is normally urged in a direction toward planet carrier 6 by means of an expansion coil spring 19 which surrounds the sleeve 20 and operates between member 16 and a nut 21 mounted on and located close to the other end of said sleeve. Nut 21 is adjustable on member 20 to vary and control the tension of resilient element 19, and to thereby maintain teeth 18a and 18a' in engagement within a predetermined range of torque transmitted from the driving to the driven assembly of the novel transmission. Teeth 18a' of member 16, over teeth 18a of planet carrier 6, transfer rotation of the driving sprocket 25 to the driven assembly 6, 7, 10 and 11. The angle $\alpha$ of surfaces 18" on annularly arranged teeth 18a, 18a' causes automatic separation of members 6 and 16 when the torque conveyed by teeth 18a' reaches or exceeds a predetermined value. Hence, planet carrier 6 and shifting member 16 act as two halves of a clutch assembly whose respective teeth 18a, 18a' will separate automatically under a given load.

Sleeve 20 abuts against an annular washer 22 which in turn abuts against the shoulder 23a in the bore of driving bushing 23. As before stated, bushing 23 rotates on antifriction rolling elements 26 disposed about the right-hand cone 4a. It will be noted that the diameter of bore in bushing 23 is so chosen that it permits insertion of regulating spring 19 with a certain amount of play. At its end facing the shifting member 16, bushing 23 is formed with teeth 23' which engage with similar teeth 16', the latter being integral with member 16. Teeth 16' are in permanent engagement with members 23' and are axially guided by the latter, that is, member 16 is slidable toward and away from the bushing 23 to the extent determined by flange 20a on the one hand, and by the tension of regulating spring 19 on the other hand.

Hub member 24' of the free-wheel or overrunning clutch 24 is connected for rotation with bushing 23 by means of a spring washer 24a. Hub member 24' itself is formed with a key which extends into the peripheral axially parallel groove 23b in bushing 23. As before mentioned, teeth 25' of sprocket 25 are in engagement with the bicycle chain (not shown) leading to the pedal-driven treadle wheel of the bicycle on which the novel multi-speed-ratio transmission is installed. The chain thus directly rotates sprocket 25 which latter transmits its rotation to bushing 23 over the aforementioned clutch 24. All elements so far described constitute a single stage or speed ratio of the novel transmission.

For transmitting the torque at a one-to-one ratio, there is provided an indirect driving connection between the shifting member 16 and the sleeve 14 which latter (in the embodiment of Fig. 1) is rigidly connected with gear rim 11 by means of the aforesaid pins 12 and spring collar 13. The indirect connection between members 16 and 14 comprises a freewheel or overrunning clutch assembly which is in the form of a ratchet brake, best shown in Fig. 3. This clutch consists of grip rollers 27 which drivingly connect shifting member 16 with a coupling ring 28 only at such times when the clutch 6, 16 is inoperative, i.e. when its teeth 18a, 18'a are separated, as shown in Figs. 5 and 6. This occurs when the torque transmitted to the driven parts of transmission has an axial component exceeding the maximum force which the teeth 18a, 18a' are capable of transmitting. In other words, when a certain torque is exceeded, teeth 18a' move away from teeth 18a whereupon the connection between the planet wheel carriers 6, 7 and shifting member 16 exists only over ring gear 11, sleeve 14 and the overrunning clutch 27, 28. Ring 28 is provided with teeth 29 which, as shown in Fig. 4, are formed with surfaces 29" enclosing an angle $\gamma$ with the plane intersecting at right angles the axis of driving member 1. Sleeve 14 is formed with similar teeth 29' having inclined surfaces 29'''. Teeth 29 and 29' are permanently connected for rotation with each other but are axially and angularly displaceable between their positions shown in Figs. 4 and 5, respectively. In the high-speed gear of my transmission, the respective front faces 29f, 29f' of teeth 29, 29' are in engagement with each other, as is shown in Fig. 4. Since the ring gear 11 and sleeve 14 rotate at a speed greater than the planet wheel carrier assembly 6, 7 in all positions of the transmission, the clutch 27, 28 remains inactive and only rotates with the other parts when the members 6 and 16 are connected over teeth 18a and 18a'.

However, if the shifting member 16 becomes disconnected from planet carrier 6 due to a certain torque conveyed by member 16 at which the surfaces 18" of rotating teeth 18a slide along equally inclined surfaces of 18" of teeth 18a' and cause shifting member 16 to move to right against the force of regulating spring 19, teeth 29 become displaced to the extent corresponding to the length of travel of teeth 18a away from teeth 18a' (Fig. 5) which moves teeth 29 into the position of Fig. 5 and causes operation of the freewheel or overrunning clutch assembly 27, 28 which latter now constitutes the sole driving connection between members 16 and 16 over the sleeve 14 and ring gear 11 connected thereto by pins 12 and split collar 13. During such displacement of teeth 18a with respect to teeth 18a', surfaces 29" of coupling elements 29 slide along surfaces 29''' of teeth 29' into the position of Fig. 5 in which the members 29 abut against a stop member 30. Teeth 29, 29' thus perform a small angular movement which causes further separation of teeth 18a from teeth 18a', these teeth forming therebetween a gap b shown in Fig. 5. It will be noted in Figs. 4 to 6 that the driving teeth are marked with arrows A. In the position of Figs. 5 and 6, teeth 29 of ring 28 transmit rotational movement to teeth 29' of sleeve 14 at a ratio of 1:1 and thus rotate ring gear 11 and wheel hub 34 at the speed of bushing 23. Planet wheel carrier assembly 6, 7 is not coupled directly with the driving parts and is thus merely rotated by planet wheels 10 which latter mesh with parts 2 and 11.

The connection of sleeve 14 with a driven part of the transmission, i.e. with wheel hub 34, comprises a ring 17 whose teeth 40' engage with teeth 40 (see Fig. 2) at the left-hand end of member 34. Sleeve 14 is formed with teeth 18b' which engage with teeth 18b forming part of ring 17. The abutting surfaces 18''' of teeth 18b, 18b' enclose an angle β with the plane passing through the transmission axis (see Fig. 4). The angle β is so selected with respect to angle α of surfaces 18'' of the first set of teeth 18a, 18a', and the tension of spring 19 is so chosen, that the teeth 18b, 18b' transmit a greater torque than members 18a, 18a'. Thus clutch 18b, 18b' becomes automatically disconnected against the force and upon contraction of spring 19 when a further change in the transmission ratio different from the one-to-one ratio becomes necessary. In other words, the change speed ratio will become less than 1:1 when teeth 18b become automatically disconnected from teeth 18b', i.e. when they move into the position of Fig. 6 to form a gap b' therebetween. The separation of teeth 18b from teeth 18b' causes axial displacement of sleeve 14 and of all parts connected therewith, that is, of planet wheel carriers 6, 7, planet wheels 10, ring gear 11, shifting member 16 and the overrunning clutch 27, 28 which latter is connected with member 16. The movement of these just enumerated parts occurs against the expanding force of regulating spring 79. The sun wheel 2 remains in its position and constantly meshes with axially shifted plane wheels 10.

Planet carrier 7 constitutes one component part of a further overrunning clutch 27', and drivingly engages with a ring 31 when the teeth 18b, 18b' become separated from each other. Ring 31 is formed with teeth 32 in a manner similar to that described in connection with ring 28 and teeth 32 engaging with teeth 32' which latter form part of ring 17. As before stated, ring 17 is permanently connected with wheel hub 34 and thus rotates the latter at a relatively low angular speed corresponding to the low-speed ratio of the transmission system. Teeth 32, 32' are axially movable with respect to each other to the extent determined by the position of an annular stop 33 which is rigidly fixed to planet carrier 7 in such position that it permits separation of teeth 18b from teeth 18b' into the position shown in Fig. 6, i.e. that these teeth define therebetween the slot b' of a width corresponding approximately to the width of gap or slot b between separated teeth 18a, 18a' (see Fig. 5). It will be observed that, when ring 31 slides in the direction of stop member 33, the inclined surfaces 32'' and 32''' of respective teeth 32, 32' slide along each other to describe a small angular movement until the teeth 32 reach the position of Fig. 6 in which they are wedged between member 33 and adjacent teeth 32', this angular movement causing separation of teeth 18b from teeth 18b' to define therebetween the aforementioned slot or gap b'. The angle δ indicating the inclination of surfaces 32'', 32''' is shown in Fig. 4. Angles γ and δ are of different magnitudes which is important as it brings about the automatic switch-back of the transmission into original speed ratio pursuant to gradual reduction in transmitted torque.

While the teeth 18b, 18b' are held apart by the deflecting surfaces 32'', 32''' of teeth 32, 32', wheel hub 34 is rotated by ring 17 over teeth 32, 32', overrunning clutch assembly 27' and planet carrier 7; the latter's rotation is relatively slow as compared with the angular speed of the driving bushing 23 or of shifting member 16 which latter rotate in unison with sprocket 25.

The operation of the just described transmission is as follows:

In Fig. 1 shifting member 16 is shown in its left-hand end position, i.e. in abutment with flange 20a in which position the spring 19 is fully or nearly fully expanded. In such position of member 16, the transmssion is in high-speed gear, that is, chain sprocket 25 transmits its rotation directly to planet wheel carrier 6 over members 23, 16, 18a' and 18a in that order. Teeth 18a, 18a' are in the position of Fig. 4. Planet wheel carrier assembly 6, 7 causes rotation of ring gear 11 at a speed greater than its own speed since the planet wheels 10, meshing with stationary sun wheel 2 on the one hand and with ring gear 11 on the other hand drive the latter at a correspondingly greater angular speed determined by the transmission ratio between members 6, 7 and 11. Ring gear 11 entrains the sleeve 14 whose teeth 18b' engage with teeth 18b of ring 17; the latter is directly coupled with wheel hub 34 and rotates same at the angular speed of ring gear 11. This high-speed ratio of the transmission remains unchanged up to a fixed magnitude of torque transmitted by teeth 18a, 18a' and 18b, 18b', said range depending upon the tension of spring 19 and the magnitude of angles α, β, respectively, defined by surfaces 18'', 18''' of respective teeth 18a, 18a' and 18b, 18b'.

However, when the torque increases beyond a predetermined magnitude, for example, when the bicycle is driven uphill; when the rider desires to rapidly increase the speed of the conveyance; due to a strong headwind; caused by a layer of snow on the road; etc., the axial component of force acting between teeth 18a, 18a' in the direction of their separation increases to an extent sufficient to separate said teeth; the latter then assume the position of Fig. 5. This axial component of transmitted force overcomes the tension of spring 19 and causes movement of teeth 29, 29' from the position of Fig. 4 into that of Fig. 5. The latter teeth describe the aforementioned relatively small angular movement with respect to each other, that is, surfaces 29'' of teeth 29 slide along surfaces 29''' of teeth 29' and engage with each other by wedge action in that teeth 29 abut against the stop member 30. Angular movement of teeth 29 with respect to teeth 29' causes the formation of gap b between teeth 18a, 18a' and members 29, 29' thereupon retain teeth 18a, 18a' in spaced-apart relationship within a predetermined range of torque transmitted from the driving or input to the driven or output parts of the transmission. The driven parts are now rotated at a one-to-one ratio by bushing 23 over shifting element 16 which latter, over the now engaged clutch or freewheel assembly 27, drives the ring 28 and over teeth 29, 29', directly rotates sleeve 14 whose teeth 18b' engage with teeth 18b of ring 17 so that the latter drives the wheel hub 34. Hence, hub 34 rotates at the speed of sleeve 22.

If the torque is further increased in the just described positon of the transmission system, teeth 18b become separated from teeth 18b' whereby the sleeve 14 becomes disconnected from ring 17 (see Fig. 6). The angular velocity of sleeve 14 is now transmitted to planet carriers 6, 7 over ring gear 11 and planet wheels 10, the planet carriers rotating at a speed less than that of sleeve 14. Carrier 7, over now operative overrunning clutch 27', becomes connected with ring 31 which latter, over teeth 32, 32', transmits its rotation to ring 17 and thereover to wheel hub 34. As before described, surfaces 32'' of teeth 32 slide along surfaces 32''' of teeth 32' and cause small angular displacement of said teeth with respect to each other from the position of Fig. 5 into that of Fig. 6 until the teeth 32 abut against the stop member 33. This angular movement of teeth 32, 32' causes the formation of gap b' between teeth 18b and 18b' and the members 32, 32' maintain the transmission in its low-speed gear within a fixed range of the torque conveyed from the driving to the driven parts of the assembly.

When the resistance to rotation of wheel hub 34 decreases, for example, when the inclination of the road decreases or when the velocity of the bicycle is reduced, that is, when the torque conveyed from the driving to the driven assembly is reduced, the transmission progressively and automatically shifts back into the medium- and thereupon into high-speed gear depending on the extent to which the torque is reduced. For that purpose, the angle δ of surfaces 32'', 32''' on respective teeth 32, 32' is greater than the angle γ of surfaces 29'', 29''' on teeth 29, 29', respectively. This may be observed in Fig. 4. There are other factors which determine the exact magnitude of torque at which the transmission shifts back from low- into medium- and thence into high-speed gear, such as the tension of regulating spring 19 and certain other factors. When the transmission shifts from low-speed (Fig. 6) into medium-speed gear (Fig. 5), teeth 32 describe a slight angular movement in reverse and thus actually unwind themselves from teeth 32' by moving away from the stop 33, which brings about engagement of teeth 18b with teeth 18b' under the force of now expanding spring 19. On further reduction of torque, teeth 29 unwind themselves from contact with stop 30 to return into the position of Fig. 4, which enables spring 19 to couple teeth 18a with teeth 18a', as is shown in Fig. 4. Thus, when the bicycle is brought to a standstill, the transmission automatically returns into high-speed gear. For all practical purposes, the transition from one into another gear occurs without any interruption in transmission of driving force and is practically noiseless, the latter advantage being attributable to the specific arrangement of teeth and the inclination of their surfaces.

It will further be noted in Figs. 4 to 6 that the faces 37, 37' of respective teeth 18a, 18a' and 18b, 18b' are inclined with respect to the plane in which they rotate. This construction on the one hand avoids non-reversibility of rotating parts which is important when the wheel hub 34 rotates in reverse direction due to the provision of freewheel clutch assemblies 27, 27', and on the other hand allows for shifting into a desired gear before the bicycle is put to use by rolling the conveyance on ground a short distance in backward direction whereby the teeth 18a and 18b become separated from respective teeth 18a', 18b' as their surfaces 37 and 37' slide along each other and cause axial movements of said teeth into the approximate position of Fig. 6, i.e. into a position in which the transmission is in low-speed gear. Thus, if the user of a bicycle desires to shift the transmission into medium- or low-gear before actually riding same, for example, when the road is steeply inclined in upward direction right from the starting point, all he must do is to roll the rear wheel back a certain distance to separate only one or both clutches 18a, 18a' and 18b, 18b', respectively.

In accordance with a slight modification of the just described transmission which is shown in Figs. 7 and 8, teeth 29, 29' may be replaced by steep threads 229, 229' similar to those used in screw gears. The operation of this modified system is identical with that previously described. Thus, when the torque conveyed by shifting element 16 to planet carrier 6 is such that it causes separation of teeth 18a, 18a', element 16 is axially displaced to right to permit sliding movements of surfaces 229'' along surfaces 229''' into the position of Fig. 8 in which teeth 229 abut against the stop 30. A gap b is formed between coupling members 18a, 18a' due to slight composite angular and axial displacement of members 229, 229' from their position of Fig. 7 into that shown in Fig. 8.

It will be readily understood that the teeth 32, 32' forming part of respective elements 17 and 7 may be replaced by coupling members similar to teeth 229 and 229'.

It is further within the scope of my invention to utilize more than a single set of planet wheels, depending upon the number of different speed ratios which the transmission should embrace. In other words, additional sets of planet wheels will be provided if it is desired that the transmission shift not only into low-, medium- and high-speed gear but into a number of additional speed ratio positions. Such additional planet wheel assemblies are then disposed coaxially with parts 6–10 and the torque is transmitted thereto by means of coupling elements similar to parts 18a, 18a'; 18b, 18b'; 29, 29'; and 32, 32', as well as over freewheel clutches analogous with systems 27 and 27'. Such additional planet wheel system or systems may travel about a single sun wheel, as will be described in connection with Fig. 16.

It will be understood by persons skilled in the art that the freewheel clutch assembly 24, 24' may be transferred from its position between sprocket 25 and driving bushing 23 to be located directly between ring 17 and the wheel hub 34, i.e. it may replace the clutch 40, 40' which, as shown in Fig. 1, permanently connects ring 17 with the member 34. Teeth 40, forming part of wheel hub 34, are also shown in Fig. 2 which is a fragmentary transverse section along line II—II of Fig. 1. Teeth 40', forming part of ring 17, are not shown in Fig. 2. The latter illustration further shows a retaining ring 36 which holds end cap 35 to the left-hand end face of hub 34.

The construction of overrunning clutch or freewheel assembly 27, 28, best shown in Fig. 3, in itself forms no part of this invention. It will, however, be noted that the provision of teeth 29, 29' on members 28 and 16, and the mounting of this overrunning clutch between shifting member 16 and sleeve 14 and/or of clutch 27' between members 7 and 31 greatly contributes to the versatility and greater efficiency of my improved transmission.

Wheel hub 34 may house a customary back-pedaling brake, not shown.

While the transmission has so far been described and illustrated as forming part of a bicycle, it can be utilized on motor driven conveyances with relatively few changes in its construction.

Referring now in greater detail to Figs. 9 to 13, there is shown an automatic transmission for use in motor driven vehicles, e.g. automobiles, motorcycles, and other automotive conveyances. In certain respects, This transmission requires some modifications since provision must be made not only for a position in which the engine is idling but also for a positon in which the driven parts revolve in reverse direction, as well as for braking action of throttled engine when the vehicle travels downhill. In addition, the transmission is subjected to considerably greater stresses in view of the limited flexibility of driving engine which is particularly felt by the automatic shifting mechanism. Finally, it may become necessary, under certain circumstances, to influence the shifting of transmission, i.e. instead of being constructed solely for automatic shifting, the transmission must comprise means enabling the operator to shift into any desired speed without awaiting that the mechanism will shift automatically. The mechanism about to be described is constructed by full consideration of just enumerated requirements for transmission in automotive vehicles.

The driving or live axle 143, shown in Fig. 9, is connected with and is driven by the engine of an automotive vehicle, not shown. At its end extending into the transmission, input axle 143 is formed with teeth 143a forming one half of a clutch assembly and permanently engaging with teeth 144a of a shiftable sleeve or muff 144 which latter surrounds the teeth 143a. Members 143a, 144a are in permanent engagement regardless of the axial position of muff 144 which latter is shiftable by a slip ring 144d into different positions in axial directions of live axle 143.

An intermediate shaft 146 extends coaxially with live axle 143 substantially the full length of the transmission and, at its terminal facing the right-hand end of shaft 143, carries a follower 145 which is disposed between a pair of thrust bearings 190, 191. Follower 145 is formed with circularly disposed teeth 145a meshing with the internal teeth 144b in the bore of muff 144. When the engine rotates axle 143 in such a way that the latter drives the automotive vehicle in forward direction, axle 143 and shaft 146 remain coupled over teeth 143a meshing with teeth 144a, and over teeth 144b of sleeve 144 meshing with teeth 145a of follower 145 which latter, as above mentioned, is rigidly connected for rotation with intermediate shaft 145. When the sleeve or muff 144 is shifted to right from its position shown in Fig. 9 to such an extent that its internal teeth 144b mesh with external teeth 147' of a nave disk 147, axle 143 is drivingly connected with an elongated sun wheel 102 which latter is rigidly coupled with disk 147. In this position of the assembly, the transmission is in reverse gear.

When the teeth 144b of sleeve 144 are moved into a non-engaging, neutral position between teeth 145a and 147' of respective parts 145, 147, the transmission is in idling gear. Sleeve 144 may be axially displaced into any of the just described three positions by means of a lever 144c and the aforementioned slip ring 144d. Lever 144c is fulcrumed in casing section 164. It will be understood that means is provided for fixing lever 144c in any one of the three positions corresponding to the setting of sleeve 144 into forward-, reverse- or idling gear.

Sun wheel 102 is freely rotatable on intermediate shaft 146, and the latter's end portions 146', 146" extend into the bores provided in the respective ends of driving axle 143 and driven axle 156, respectively. Thus, by itself, shaft 146 is freely rotatable with respect to axles 143 and 156.

Nave disk 147 carries a brake drum 148a forming part of a band brake 148, the latter's function being to reduce the angular velocity of sun wheel 102 when said wheel rotates in forward direction. Thus, when the brake 148 is applied, brake drum 148a over nave 147 conveys the speed-reducing force to the sun wheel 102.

A planet wheel carrier assembly 106, 107 is freely rotatable about sun wheel 102. Planet carriers 106, 107 are held apart by tubular members 108 which are traversed by screws 109. Planet wheels 110 mesh with sun wheel 102 on the one hand, and with ring gear 111 on the other hand. Carrier 107 is formed with teeth 107a which are in permanent engagement with teeth 150' of a second nave disk 150. Disk 150 is rigidly connected with a second brake drum 150a forming part of a band brake 149 whose purpose is to hold fast planet carriers 106, 107 when the transmission is in reverse gear. Axial position of nave disks 147 and 150 is determined by the aforementioned thrust bearing 191 and by two additional antifriction bearings 192, 193. Sun wheel 102 is held against axial displacements by bearing 191 and by a shoulder 146s on intermediate shaft 146. Brakes 148, 149 may be actuated by a control lever mechanism generally indicated by reference numeral 151 in a manner to automatically release one brake when the other brake is applied, and vice versa. It will be understood that the brake assemblies 148, 149 may be replaced by claw couplings, ratchet-and-pawl devices, or the like.

Shifting sleeve or muff 144 which, by its positioning, establishes the connection between live axle 143 and intermediate shaft 146; between live axle 143 and sun wheel 102; or permits independent rotation of member 143, may be replaced by a two-way friction clutch or the like. Also, a gradually engaging coupling (not shown), for example, a friction clutch or the like, is usually disposed between the engine and the live axle 143, its purpose being to disconnect the axle from the engine, when necessary.

Planet carrier 106 is provided with teeth 118a at its right-hand side facing away from wheels 110, these teeth meshing with similar teeth 118a' forming part of shifting member 116. The latter is rotatably mounted on shaft 146 and is movable in axial directions of the transmission. A second set of teeth 116' on shifting member 116 engages with teeth 123' of driving bushing 123, teeth 116' with member 116 being axially slidable with respect to sleeve 123. The latter is formed with tongues received in the nuts or cutouts of shaft 146 so that the members 123 and 146 always rotate in unison, i.e. the bushing is driven by the intermediate shaft. Regulating spring 119 is loosely mounted around the periphery of bushing 123, one of its ends bearing aganst sleeve 116 while its other end abuts against a ring 157a which latter forms part of an annular piston or plunger 157 made of a suitable plastic material. Piston 157 regulates the tension of spring 119 and is for that purpose installed in a cylinder 179 defining an enclosure or pressure chamber 178. Cylinder 179 is rigidly connected with bushing 123 by means of screws 179a or the like. Annular piston 157 is adjustable within enclosure 178 between the end wall of cylinder 179 and a stop 179' adjacent to the open end of said cylinder through which the right-hand end of regulating coil spring 119 extends. Enclosure 178 communicates with channels 177, 176 leading to the pressure side of a pumping device which latter thus controls the position of piston 157 and thereover the tension of spring 119. The operation of said pump preferably depends on the angular velocity of the driven assembly, the pump supplying a pressure medium, for example, lubricating oil, so that the tension of spring 119 is proportional with the speed of the driven means of the improved transmission.

Shifting element 116 is formed with a third set of teeth 129 permanently engaging with similar teeth 129' on a ring 128' which latter forms part of an overrunning clutch. As shown in Fig. 9, teeth 129 are disposed about the periphery of member 116 and are axially shiftable therewith relative to teeth 129'. Coupling sleeve or second shifting member 114 which is rigidly connected for rotation with ring gear 111 defines in its bore a conical coupling surface 114' adjacent to and adapted to be engaged by a similar conical surface 128c forming part of the peripheral zone of coupling ring 128'. Thus, members 114 and 128' form a friction clutch which becomes operative when the clutch consisting of teeth 118a, 118a' becomes disconnected by the axial component of force acting between parts 106, 116 in the manner as described in connection with teeth 18a, 18a' shown in Fig. 5. When active, friction clutch 114, 128' over the engaging surfaces 114', 128c transmits torque from shifting element 116 to the ring gear 111. When the friction clutch 114, 128' is inoperative, a very small clearance is formed between the surfaces 114', 128c, the magnitude of this clearance being determined by a spacing ring 130" disposed between an abutment or stop 130' and coupling ring 128'.

In contrast to the embodiment of Figs. 1 to 8, deflecting teeth 118b' are formed on the ring gear 111, not on sleeve 114, these teeth being adapted to drive a member 152 over an intermediate member 133' which latter is formed with two sets of teeth 118b, 133a, teeth 133a engaging with teeth 152a of driven member 152 and the teeth 118b engaging with teeth 118b' of ring gear 111. Intermediate member 133', in addition to connecting parts 111 and 152, also serves as an abutment or stop for the teeth 132 formed on an annular member 107' which latter is rigidly connected to and is thus axially slidable with planet carrier 107. Carrier 107 is movable in the axial direction of intermediate shaft 146 together with other component parts of the planet wheel assembly, i.e. with members 106 and 108–110. Teeth 132 are in permanent engagement with teeth 132' of a coupling ring 131' which latter forms the movable member of a second friction clutch whose stationary member 117' is drivingly connected with driven part 152. As shown, ring 131' is formed with a conical peripheral surface adapted to frictionally engage with the conical surface in the part 117'. When the second friction clutch is operative, torque is transmitted directly from planet carriers 106, 107 to the driven part 152, it being assumed that the teeth 118b, 118b' are already separated. Here, too, spacing ring 133" between coupling ring 131' and stop 133' determines the magnitude of the relatively small clearance between the surfaces of clutch 117', 131' when the latter is inactive. Friction clutches 114, 128' and 117', 131' becomes operative when the clutches consisting of respective teeth 118a, 118a' and 118b, 118b' are already separated.

Referring now to Figs. 13 to 15, there are shown the teeth 129, 129' of respective parts 116, 128' in three different positions. In Fig. 13, teeth 129' are in abutment with stop 130' which means that the teeth 118a, 118a' are separated. In Fig. 14 surfaces 129" of teeth 129 abut against the surfaces 129''' of teeth 129', torque being transmitted from teeth 129 of shifting member 116 to teeth 129' of ring 128' and thence to sleeve 114 over friction surfaces 128c, 114'. In Fig. 15, finally, surfaces 141 on teeth 129 engage with and convey torque to surfaces 141' on teeth 129', and thence to ring 128' and sleeve 114 in the opposing direction, as again indicated by the arrows.

The construction of teeth 132, 132' is identical. Their respective inclined surfaces 132", 142 and 132''', 142' are shown in Fig. 9. When teeth 132 abut against the stop 133', clutch 118b, 118b' is inactive, there being a gap or clearance therebetween similar to gap b' shown in Fig. 6.

The purpose of surfaces 141, 141' and 142, 142' on respective sets of jaws 129, 129' and 132, 132' is to maintain frictional engagement of clutches formed thereby also in cases when the normally driven side of the transmission becomes the driving component and the engine is throttled. Thus, and as above described, surfaces 141, 141' and 142, 142' are so positioned that they can bring about transfer of rotation in a direction opposed to the normal direction of transfer. The inclination of these surfaces, as well as the inclination of meeting surfaces of deflecting clutches 118a, 118a' and 118b, 118b' is so chosen (in dependency on the components of rotation-transmitting forces acting in the axial direction of shaft 146 and also in dependency on the tension of regulating spring 119), that the transmission will automatically shift into another speed when a certain magnitude of torque is reached or exceeded.

The driven means is shown in Fig. 9 as a composite housing consisting of a main section 152 and a front end wall member 154, these two parts being in engagement by means of claws or splines for rotation in unison and are held in such position by a ring 153, which latter is internally threaded to mesh with external threads on members 152, 154. Housing section 152 is rigidly connected with driven axle 156. Openings 152' are formed not only in section 152 but also in end wall member 154, their purpose being to permit escape of superfluous lubricant from the housing.

Essentially, the automatic shifting of transmission shown in Fig. 9 occurs in the manner as described in connection with the embodiment of Fig. 1 with the difference, however, that rotation begins when the transmission is in its low-speed gear which is customary in engine-driven automotive vehicles. This is accomplished by the provision of aforementioned pumping device which operates in dependency on the angular speed of the driven axle 156 to introduce a pressure fluid into enclosure or pressure chamber 178 of cylinder 179 and to thereby control the tension of regulating coil spring 119. As before described, pressure medium introduced into chamber 178 by the pumping device acts upon and displaces plunger 157 which conveys the pressure to spring 119 by compressing the latter or by permitting the spring to expand in the direction toward the end wall of open cylinder 179. In Figs. 9 and 12, the pumping device is represented as a gear pump, Fig. 12 illustrating the device in open position with the gears exposed. The pump is built into the outer housing section 163 of the transmission and comprises a casing 158 provided with a removable cover 159, and meshing gears 160, 161 which are freely rotatable in suitable cutouts provided in housing 158. Gear 160 is keyed to the driven axle 156 and rotates the eccentrically mounted internally toothed gear 161. A portion of the gap between the teeth of gears 160, 161 is closed by a partition 172 to which the teeth of members 160, 161 are closely adjacent.

A suitably arranged system of channels and openings 165, 166, 167, 168 and 165', 166', 167', 168' in pump housing 158, as well as the provision of check valves 169, 170 and 169', 170' enable the pumping device to deliver pressure medium only in the direction of arrows (see Figs. 9 and 12) toward and into the pressure chamber or enclosure 178 regardless of the direction in which the driven axle 156 or the pumping device itself rotates. For example, when the axle 156 rotates in clockwise direction, as indicated by arrow P in Fig. 12, gears 160, 161 rotate in the same direction to suck the pressure medium through delivery pipe 181 in the direction of arrow 171. The medium flows in the cutout 180 provided in the periphery of casing 158 into and through bore 165, past the check valve 169 and through a short channel 166 into the suction gaps between the teeth of gears 160, 161 and, being restricted by the partition 172, the medium continues its flow to the opposing side of partition 172 into the pressure chamber 173. Over the check valve 170', the medium continues its flow from chamber 173 into the upper connecting channel or cutout 174 and finally through bores and openings 168, 168', 175, 176, 177 into the enclosure 178 behind the plunger 157. As above mentioned, the displacement of plunger 157 in the direction of spring 119 is limited by a stop 179' and, depending on the plunger's position and hence on the pressure of medium conveyed by the pumping device, the tension of spring 119 is regulated accordingly.

When the pump rotates in the direction opposed to that indicated by arrow P, the flow of pressure medium is somewhat different in that the medium, coming from line 181 in the direction of arrow 171 and passing in cutout 180 into and through bore 165' and over check valve 169', through the short channel 166' enters into the gap between the teeth of meshing gears 160, 161 at the left hand side of Fig. 12, these gaps now acting as suction orifices. The medium is then led about and along the partition 172, past the check valve 170 and into the upper connecting channel 174, and thence through bores and openings 168, 168', 175, 176 and 177 again into the pressure chamber 178 behind the plunger 157.

Suction bores 165 and 165' in pump housing 158 communicate with each other over the lower channel 180; the latter, as above described, also communicating with line 181 leading to an oil sump 182 or another source of pressure medium. A bypass conduit system 183, 183' communicates with the upper connecting channel 174, this bypass conduit system being also connected with a throttling device 184 which latter may be disposed in or externally of the outer transmission housing 162–164. A safety overflow valve 185 is installed between lines 183, 183'. Throttling device 184 is preferably controlled from the driver's seat, e.g. by an actuating member installed near the steering wheel and/or the steering column and, as shown in Fig. 9, the pressure of the medium may be controlled in that the device 184 is capable of changing the diameter of the passage through which the medium flows. Thus, throttling device 184 may also control changes in the tension of regulating spring 119 and can thus determine the exact point at which the transmission shifts from one into another speed ratio over the entire operating range. This may be made in dependency on the accelerator of the engine. The direction of flow of pressure medium in channels 183, 183' and in safety valve 185 is shown in Fig. 9 by arrows 171a.

The motor-driven transmission shown in Figs. 9 to 15 operates as follows:

When the live axle 143 is not rotated, direction reversing and disconnecting means or muff 144 is moved into the position of Fig. 9 by member 144d and actuating lever 144c, it being assumed that the transmission is intended to transmit rotation in forward direction. In this position, muff 144 connects axle 143 with intermediate shaft 146 over the follower disc 145. The angular speed and torque of axle 143, when it begins to rotate, is transmitted by shaft 146 to the bushing 123 which latter in turn drives shifting member 116 at the same angular speed. The position of elements shown in Fig. 9 in idle position, i.e. before the axle 143 is coupled with the running motor, would actually correspond to the high-speed gear ratio of the transmission which requires that there exist a certain pressure in the chamber 178 of cylinder 179 sufficient to move the piston or plunger 157 all the way into abutment with stop 179'. However, as shown, the throttling device 184 does not fully close the path of the fluid through line 183 and, while the driven axle 156 remains idle, the spring 119 is free to push plunger 157 all the way back into abutment with the end wall of cylinder 179 because the pumping device 158—161 is also idle and does not deliver pressure medium into chamber 178. The spring 119 is now practically fully expanded and thus does not possess sufficient force to appreciatively influence the coupling connection between teeth 118a, 118a' and 118b, 118b'. In addition, when the vehicle is set in motion, throttling device 184 is always set in such position that it permits maximum flow of pressure medium therethrough whereby the initially slowly rotating driven axle 156 and hence equally slowly rotating gears 160, 161 cannot as yet produce effective pressure of the medium. Therefore, as the spring 119 is not under tension when the vehicle is at a standstill, teeth 118a, 118a' and 118b, 118b' are not engaged. Thus, the lowest speed ratio sets in automatically by the transmission immediately after the vehicle is set in motion. Rotation is transmitted by shifting member 16 over the clutch assembly 129, 129' and friction clutch 114, 128' to ring gear 111. Planet wheels 110 which roll along and are in mesh with ring gear 111 as well as with sun wheel 102 transmit rotation to planet carriers 106, 107 which latter transmit rotation at a reduced ratio over clutch assembly 132, 132' by means of the now effective friction clutch 117', 131' to the driven part 152 and thereover to the driven axle 156.

Depending upon driving conditions, the accelerator of the vehicle engine is depressed either for the purpose of increasing the forward speed of the vehicle or for the purpose of increasing the engine torque. Any changes in the position of throttling device 184 need not necessarily occur simultaneously with the actuation of the accelerator, this being necessary only under exceptional circumstances. The pump assembly 158—161 is always in operation when the vehicle is in motion and delivers pressure medium into chamber 178 in quantities determined by the cross-sectional area of throttling device 184 and, in connection with the passage of overflow valve 185, causes displacement of plunger 157 in such direction as to compress the spring 119. As the resistance of wheels to acceleration decreases, and assuming that the position of engine accelerator remains unchanged, the transmission will shift automatically first from stepdown gear into direct gear (one-to-one ratio) in that the teeth 132, due to the inclination of their surfaces 132" and due to the action of now compressed spring 119, slide along the surfaces of teeth 132' causing disconnection of friction clutch 117', 131' and subsequent engagement of teeth 118b, 118b'. The latter transmit rotation of ring gear 111, rotating at the speed of live axle 143, directly to the driven part 152 of the transmission. As the resistance to acceleration further decreases, the transmission shifts into high-speed gear from the direct-drive position in which, as just described, the driven parts were rotated at the one-to-one ratio with respect to angular speed of live axle 143. This occurs as the teeth 129, due to their inclined surfaces 129" and also due to the action of spring 119, slide along teeth 129' causing disconnection of friction clutch 114, 128' and engagement of teeth 118a, 118a'. In the just described position of said parts, shifting member 116 drives planet carriers 106, 107 and the difference in angular speed of members 106, 107 as compared with the speed of ring gear 111 brings about more rapid rotation of the driven part 152.

If the clutch members 118a, 118a' become separated, shifting member 116 performs an axial movement against the expanding force of spring 119. When the clutch 118b, 118b' is disconnected, the entire planet wheel carrier and ring gear assembly 106—111 as well as the sleeve 114 move together with shifting member 116 in the axial direction of shaft 146 and again counter to the expanding force of spring 119. Planet wheels 110 slide along sun wheel 102 but remain in mesh therewith. Teeth 116' of shifting member 116 remain in permanent engagement with teeth 123' of driving bushing 123 while the member 116 either compresses the spring 119 when moving to right of Fig. 9 or allows the spring to expand when moving to left.

When the resistance to rotation of driven parts increases, for example, when the automotive vehicle moves uphill but the position of engine accelerator remains unchanged, the angular speed of part 152 decreases gradually and hence the output of pump assembly 158—161 also decreases. Thus, and assuming that the throttling device 184 now permits maximum flow of pressure medium therethrough, there is a drop in pressure and the tension of spring 119 is reduced accordingly. This brings about a changed condition in that the axially parallel components of forces acting between surfaces 118" of teeth 118a, 118a' overcome the tension of spring 119 and these teeth become automatically disconnected to cause engagement of friction clutch assembly 114, 128' by means of teeth 129, 129' and subsequent change of transmission ratio in that the driving and driven parts rotate at the same speed. When the resistance to rotation of driven parts further increases, and especially when the resistance to rotation of driven parts is increased rather suddenly or when the position of the accelerator is changed, the same mode of operation occurs with teeth 132, 132', with the friction clutch assembly 117', 131' and with the clutch assembly 118b, 118b' to bring about automatic shifting of the transmission into low-speed gear. When the cross-sectional area of throttling device 184 is reduced, the pressure medium transmitted by pump 158—161 can circulate to oil sump 182 through the overflow valve 185 which is set at a definite compressive tension, and through the bypass conduit system 183' to thus prevent stalling of the engine.

When the engine is throttled during downhill travel of the vehicle, the transmission operates in analogous manner with the difference, however, that the normally driven parts, i.e. the axle 156 and member 152, now act as the driving parts whereby the other deflecting surfaces 137 and 137' of teeth 118a, 118a' and 118b, 118b' as well as the surfaces 141, 141' and 142, 142' of respective teeth 129, 129' and 132, 132' become active. It will be noted that the inclination of these last-mentioned surfaces is somewhat less than the inclination of surfaces 118" and 118'" which, however, in most cases is not necessary due to the towing drag of the throttled engine. The braking effect of the throttled engine depends on the particular gear ratio in which the transmission is momentarily shifted. The latter is, however, selectively and optionally adjustable by the setting of throttling device 184 which, over plunger 157, controls the tension of spring 119. When the throttling device is fully open, and though the accelerator may not be depressed, the transmission can operate in highest gear on a horizontal road and can achieve a maximum braking effect.

When the transmission is to be shifted into reverse gear, muff 144 together with its teeth 144b is moved into the direction to right in Fig. 9 so that teeth 144b engage with teeth 147' of member 147 which latter is non-rotatably connected with the sun wheel 102. Assuming that the brake 148 is released and that the brake 149 is applied, i.e. that the planet carriers 106, 107 are prevented from rotation, live shaft 143 now rotates sun wheel 102. Rotating member 102 drives the planet wheels 110 and ring gear 111 in opposing direction at a lower speed. Clutch assembly 118*b*, 118*b'* is operative and thus connects ring gear 111 with the driven parts 133', 152, 156 of the transmission. Clutch 118*b*, 118*b'* is then held in operative position by a lever mechanism 186 or the like which latter, over a thrust bearing 187, causes displacements of a stop 188. Stop 188 is guided in housing section 152 and may be pressed against the sleeve 114 which latter, as already described, is rotatably connected with ring gear 111. Sleeve 114 rotates in reverse direction at the angular speed of housing section 152 and of stop member 188. It will be noted that the inner race of thrust bearing 187 rotates with and bears against member 188 while the outer race of said bearing follows the movements of lever mechanism 186 to move with the inner race in axial directions of the transmission and hence with stop 188 toward or away from sleeve 114. Return springs 189 move the stop 188 back to right and away from sleeve 114 whenever the lever mechanism 186 is in the position of Fig. 9, i.e. when the engine is idle or rotates the transmission in the direction in which live axle 143 rotates. Lever mechanism 186 thus constitutes a lock against disengagement of deflecting clutch assembly 118*b*, 118*b'*.

In order to prevent unintentional faulty shifting by the driver, lever mechanism 144*c*, 144*d* for the muff 144 and the alternately operable brakes 148, 149, as well as the lever mechanism 186 for stop member 188 may be so installed that they are automatically actuatable by a single control element, such as a servo mechanism or the like. In certain instances, even the means for actuating the throttling device 184 may be connected for automatic operation by such common control means. This is preferably done in such manner that, if necessary, throttling device 184 may in addition be actuated independently in two different directions, i.e. to either reduce or increase the cross-sectional area of the passage for pressure medium into the pump assembly 158—161 and thence into the pressure chamber 178.

It is further within the scope of my invention to replace the stationary housing 162—164 of Fig. 9 by a rotatable housing analogous to wheel hub 34 of Fig. 1; such rotatable housing may then constitute the wheel hub of a motorcycle or a like motor-driven conveyance. Similarly, the transmission of Fig. 1 which, as described, is intended for use in conveyances not driven by an engine, may also be formed with a non-rotating housing, if desired. Still further, braking devices 148, 149 may be disposed either in or externally of the transmission housing 162—164.

As a further modification of the above-described embodiments of my transmission, the latter may be formed with more than a single regulating spring. For example, springs may be disposed at both sides of the planet wheel assembly and so installed that the tension of one or more springs at one side exceeds the tension of one or more springs at the other side of the planet wheels. In such instances, a single spring may control only one speed of the transmission and it is also possible in such constructions that the planet wheel assembly need not be axially displaced at all when the transmission shifts from one into another speed.

In contrast to the embodiments described in connection with and shown in Figs. 1 and 9 of the drawings, i.e. in which in all positions of the transmission the torque in its entirety is conveyer by the planet wheel assembly, the invention also contemplates such modifications according to which the torque, in at least one position of the transmission, may be branched off to be conveyed over two distinct parts, for example, by the sun wheel and by the gear wheel of the planet assembly. In such modifications, the arrangement of clutches 129, 129'; 132, 132' of overrunning clutches 127, 127', or of friction clutches 114, 128' and 117', 131' needs slight changes which will be quite obvious to men skilled in the art.

As before mentioned and as shown in Fig. 16, the improved transmission may comprise more than a single set of planet wheels. This illustration is quite similar to that of Fig. 9. The difference is in that the coupling ring 117' is not connected with part 152 but with a connecting member 370. This latter part is of substantially Z-shape and consists of an annular member which is provided with radially inwardly and outwardly extending teeth, these teeth permanently engaging with teeth of coupling ring 117' on the one hand, and with the teeth of a second shifting member 316 on the other hand. Thus, torque is transmitted from coupling ring 117' of the first planet wheel assembly 106—111 to the second shifting member 316 of the second planet wheel assembly 306—311. In this manner, it is possible to realize five different transmission ratios by the utilization of two planet wheel assemblies 106—111 and 306—311, respectively. Obviously, it is equally possible to connect coupling ring 117' directly with sleeve 314 and to thus bypass the second shifting member 316. In such instances, the transmission has only four speed ratios. Parts 314 and 331', 332, 332' and 333" shown in Fig. 16 are analogous with parts 114 and 131, 132, 132' and 133" shown in Figs. 9 and 16, but cooperate with the second planet wheel assembly 306—311.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An automatic change-speed and torque transmission comprising, in combination: rotatable input means; shifting means connected for rotation with said input means; at least one planet assembly comprising three components the first component of which consists of sun wheel means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means; spring biased deflecting clutch means between said shifting means and one of said components, said clutch means having a first position in which it connects said shifting means with said one component when the torque transmitted by said input means to said one component is below a fixed magnitude, and a second position in which it releases said shifting means from said one component when the torque exceeds said magnitude; second clutch means between said shifting means and another of said components so installed as to connect said shifting means with said other component when said deflecting clutch means is in said second position; rotatable output means; and means for connecting said output means with a selected component, the transmission operating in such manner that, when the shifting means is connected to a component other than the component connected with said output means the latter is rotated at a speed proportional to the transmission ratio of said last mentioned components whereas, if said shifting means and said output means are connected to the same component the output means is rotated at the speed of said shifting means.

2. An automatic change-speed and torque transmission comprising, in combination: rotatable input means having an axis; shifting means connected for rotation with said input means and axially slidable with respect thereto; resilient means for constantly urging said shifting means in one axial direction of said input means; at least one planet assembly coaxial with said input means and comprising three components the first component of which consists of sun wheel means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, each two of said components having different speed transmission ratios; said shifting means and one of said components defining two halves of first clutch means normally engaging under the action of said resilient means, said halves having teeth with surfaces so inclined as to transmit torque below a fixed magnitude from said input means over said shifting means to said one component and to automatically separate said halves against the force of said resilient means when the torque transmitted by said shifting means exceeds said magnitude; second clutch means between said shifting means and another of said components for connecting said other component with said shifting means when the halves of said first clutch means are separated; and rotatable output means connected with said other component, the transmission operating in such manner that, when the shifting means is connected with said one component the output means rotates at a speed proportional to the transmission ratio between said one and said other component and, when the shifting means is connected to said other component the shifting means and the output means rotate at the one-to-one ratio.

3. An automatic change-speed and torque transmission comprising, in combination: rotatable input means having an axis; shifting means connected for rotation with said input means and axially slidable with respect thereto; resilient means for constantly urging said shifting means in one axial direction of said input means; at least one three-component planet assembly the first of which consists of sun wheel means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, the sun wheel means of said planet assembly being coaxial with said input means and each two of its components having different speed transmission ratios; said shifting means and said planet carrier means defining two halves of first clutch means normally engaging under the action of said resilient means, said halves having teeth with surfaces so inclined as to transmit torque below a fixed magnitude from said input means over said shifting means to said planet carrier means and to automatically separate said halves when the torque transmitted by the shifting means exceeds said magnitude; second clutch means between said shifting means and said ring gear means for connecting the latter with the shifting means when said halves are separated; and rotatable output means connected with said ring gear means, the transmission operating in such manner that, when the shifting means is connected with said planet carrier means said output means rotates at a speed proportional to the transmission ratio of said planet carrier means and said ring gear means and, when the shifting means is connected with said ring gear means the shifting means and the output means rotate at one-to-one ratio.

4. An automatic change-speed and torque transmission as set forth in claim 3, further comprising means operative when the torque exceeds said fixed magnitude for maintaining the halves of said first clutch means in separated position.

5. In a conveyance having a driven wheel, an axle, a hub fixed to said wheel and rotatable about said axle, a driving sprocket rotatable about said axle, and means for rotating said sprocket, an automatic change-speed and torque transmission comprising, in combination: a driving bushing rotatable about said axle; means for connecting said bushing with said sprocket for rotation therewith in at least one direction; shifting means coaxial with said bushing and connected for rotation therewith, said shifting means being axially slidable with respect to said bushing; a planet assembly coaxial with said hub, said assembly comprising sun wheel means fixed to said axle, planet carrier means rotatable about said sun wheel means, ring gear means rotatable about said carrier means and connected with said hub for rotation therewith in at least one direction, and planet wheel means rotatably supported by said carrier means and meshing with said sun wheel means and with said ring gear means, respectively; resilient means for constantly urging said shifting means in a direction toward said planet assembly; said carrier means and said shifting means constituting two halves of first deflecting clutch means having teeth with surfaces so inclined as to transmit torque and rotation from said shifting means to said carrier means when the torque is below a fixed magnitude and to automatically separate said halves when the torque exceeds said magnitude; and second clutch means between said ring gear means and said shifting means for rotatably connecting same when the halves of said first clutch means are separated, the transmission operating in such manner that, when the sprocket is driven in a direction to rotate said bushing and said shifting means whereby the latter transmits to said carrier means torque below said magnitude the ring gear means rotates said hub at a speed proportional to the transmission ratio between said carrier means and said ring gear means and, when the torque exceeds said magnitude the second clutch means rotates the ring gear means and the hub at the speed of said shifting means.

6. An automatic change-speed and torque transmission comprising, in combination: rotatable input means having an axis of rotation; shifting means connected for rotation with and axially movable relative to said input means; at least one planet assembly coaxial with said input means; said assembly comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said carrier means being axially movable with respect to said input means together with said planet wheel means and said ring gear means; resilient means for constantly urging said shifting means toward said planet assembly; first clutch means between said shifting means and said carrier means comprising a pair of halves having teeth with surfaces so inclined as to normally engage by the action of said resilient means whereby to transmit torque up to a fixed magnitude from said shifting means to said carrier means, and to separate said halves against the force of said resilient means when the torque exceeds said magnitude; second clutch means between said shifting means and said ring gear means for drivingly connecting same when the halves of said first clutch means are separated; rotatable output means coaxial with said input means; third clutch means between said ring gear means and said output means comprising two halves having teeth with surfaces so inclined as to normally engage under the action of said resilient means over said shifting means and said ring gear means for transmitting torque up to a fixed magnitude higher than said first mentioned magnitude, and to separate said last mentioned halves when the torque exceeds said higher magnitude; and fourth clutch means between said carrier means and said output means for drivingly connecting same when the halves of said third clutch means are separated, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said ring gear means, said carrier means and said fourth clutch means.

7. An automatic change-speed and torque transmission as set forth in claim 6, wherein said first and third clutch means are deflecting clutch means, and said second and fourth clutch means are overrunning clutch means.

8. An automatic change-speed and torque transmission as set forth in claim 6, wherein said first and third clutch means are deflecting clutch means and said second and fourth clutch means are friction clutch means.

9. An automatic change-speed and torque transmission as set forth in claim 6, further comprising means for varying the tension of said resilient means.

10. An automatic change-speed and torque transmission comprising, in combination: rotatable input means having an axis; shifting means connected for rotation with said input means and axially slidable with respect thereto; resilient means for constantly urging said shifting means in one axial direction of said input means; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means; two of said components being slidable in the axial directions of said input means and each two of said components having different speed transmission ratios; said shifting means and one of said slidable components defining two halves of a first clutch means normally engaging under the action of said resilient means, said halves having teeth with surfaces so inclined as to transmit torque below a fixed magnitude from said input means over said shifting means to said one component and to automatically separate said halves against the force of said resilient means when the torque transmitted by said shifting means exceeds said magnitude; second clutch means between said shifting means and the other of said slidable components for connecting said other component with the shifting means when said halves are separated; rotatable output means; third clutch means disposed between said output means and said other component comprising two spring biased halves having teeth with surfaces so inclined as to normally engage and transmit torque below a fixed magnitude greater than said first mentioned magnitude, and to separate said halves when the torque between said last mentioned halves exceeds said higher magnitude; and fourth clutch means between said one component and said output means so installed as to connect same when the halves of said third clutch means are separated, the transmission operating in such manner that, when the shifting means transmits torque below said first mentioned magnitude, the output means is rotated over said one component, said other component and said third clutch means at a speed different from the speed of said input means; when the shifting means transmits torque above said first mentioned but below said last mentioned magnitude, the output means is rotated at one-to-one ratio over said other component and said third clutch means; and when said shifting means transmits torque greater than said last mentioned magnitude, the output means is rotated over said second clutch means, said other component and said fourth clutch means again at a speed different than the speed of said input means.

11. An automatic change-speed and torque transmission comprising, in combination: rotatable input means having an axis of rotation; shifting means connected for rotation with and axially movable relative to said input means; at least one planet assembly coaxial with said input means, said assembly comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said carrier means being axially movable with respect to said input means together with said planet wheel means and said ring gear means; resilient means for constantly urging said shifting means toward said planet assembly; first clutch means between said shifting means and said carrier means comprising a pair of halves having teeth with surfaces so inclined as to normally engage by the action of said resilient means whereby to transmit torque up to a fixed magnitude from said shifting means to said carrier means, and to separate said halves against the force of said resilient means when the torque exceeds said magnitude; second clutch means between said shifting means and said ring gear means for drivingly connecting same when the halves of said first clutch means are separated; rotatable output means coaxial with said input means; third clutch means between said ring gear means and said output means comprising two halves having teeth with surfaces so inclined as to normally engage under the action of said resilient means over said shifting means and said ring gear means for transmitting torque up to a fixed magnitude higher than said first mentioned magnitude, and to separate said last mentioned halves when the torque exceeds said higher magnitude, the inclination of said last mentioned surfaces with respect to the axis of said input means being different from the inclination of said first mentioned surfaces; and fourth clutch means between said carrier means and said output means for drivingly connecting same when the halves of said third clutch means are separated, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said gear ring means, said carrier means and said fourth clutch means.

12. An automatic change-speed and torque transmission as set forth in claim 10, wherein the angle of inclination of surfaces on the teeth of said third clutch means with respect to the axis of said input means is smaller than the angle of inclination of surfaces on the teeth of said first clutch means.

13. An automatic change-speed and torque transmission comprising, in combination: rotatable input means having an axis of rotation; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means meshing with said sun wheel means and with said ring gear means, said carrier means and said ring gear means being slidable in axial directions of said input means; shifting means connected for rotation with said input means and axially slidable with respect thereto; resilient means for constantly urging the shifting means toward said planet assembly; first clutch means comprising a first and a second toothed member connected for rotation with said shifting means and with said carrier means, respectively, said members having complementary teeth with surfaces so inclined as to maintain said members in mesh by the force of said resilient means up to a fixed magnitude of torque transmitted from said shifting means to said carrier means and to separate said members against the force of said resilient means when the torque exceeds said magnitude; overrunning clutch means comprising a first member fixed to said shifting means and a second member; third clutch means comprising a first toothed member fixed to the second member of said overrunning clutch means and a second toothed member fixed to said ring gear means, said last mentioned two toothed members having a first set of surfaces for transmitting rotation when the toothed members of said first clutch means are engaged, and a second set of surfaces inclined with respect to said plane, said second set of surfaces engaging with each other and maintaining said shifting means in a fixed axial position against the force of said resilient means when the members of said first clutch means are separated; and output means rotatably connectable with said ring gear means and said carrier means, the transmission operating in such manner that, when the members of said first clutch means are engaged the shifting means rotates said carrier means and thereover said ring gear means whereas, when the members of said first clutch means are separated the shifting means rotates said carrier means over said overrunning clutch means, said third clutch means and said ring gear means whereby said second set of surfaces maintains the members of said first clutch means separated while the torque transmitted from said shifting means to said carrier means exceeds said magnitude.

14. An automatic change-speed and torque transmission comprising, in combination: rotatable input means having an axis of rotation; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means meshing with said sun wheel means and with said ring gear means, the ring gear means being connected by said planet wheel means for rotation with said carrier means at a higher speed ratio, said ring gear means and said carrier means being movable in axial directions of said input means; shifting means connected for rotation with said input means and axially slidable with respect thereto; resilient means for constantly urging said shifting means toward said planet assembly; rotatable output means coaxial with said input means; first and second deflecting clutch means each comprising a pair of toothed members non-rotatably connected, respectively, to said shifting means and said carrier means, and to said ring gear means and said output means, the toothed members of each of said clutch means having complementary teeth with surfaces so inclined with respect to the plane passing through the axis of said input means as to maintain the respective members engaged by the action of said resilient means up to a first and second magnitude of torque transmitted from said shifting means to said carrier means and from said ring gear means to said output means, respectively, to thereupon separate the members of said first clutch means when the torque exceeds said first magnitude, and to finally separate the members of said second clutch means when the torque transmitted from said ring gear means to said output means exceeds said second magnitude, the separation of respective members of said first and said second clutch means causing compression of said resilient means; second and third clutch means disposed between said shifting means and said ring gear means, and between said carrier means and said output means, respectively, each of said third and fourth clutch means comprising a first member rotatable with said shifting means and said carrier means, respectively, and a second member; fifth and sixth clutch means between said third clutch means and said ring gear means, and between said fourth clutch means and said output means, respectively, each of said fifth and sixth clutch means comprising a pair of toothed members, the members of said fifth clutch means being connected for rotation with the second member of said third clutch means and with said ring gear means, and the members of said sixth clutch means being connected for rotation with the second member of said fourth clutch means and with said output means, respectively, the members of said fifth and sixth clutch means having teeth formed with a first set of surfaces parallel with the plane passing through the axis of said input means and a second set of surfaces inclined with respect to said plane, said first set of surfaces engaging and transmitting rotation from the second member of said third clutch means to said ring gear means, and from the second member of said fourth clutch means to said output means, respectively, when the members of said first and second clutch means are engaged, and said second sets of surfaces transmitting rotation when the members of said first and second clutch means are separated and maintaining the latter in such separated position when the torque exceeds said first and said second magnitude, respectively, the transmission operating in such manner that, when the torque transmitted by the shifting means to said carrier means is below said first magnitude the output means is rotated by said ring gear means over said second clutch means at a speed greater than the angular speed of said input means whereas, when the torque exceeds said first magnitude the output means is rotated at one-to-one ratio with respect to said input means over said third and fifth clutch means, said ring gear means and said second clutch means and, when the torque exceeds said second magnitude the output means is rotated at a speed less than that of said input means over said third and fifth clutch means, said ring gear means and said carrier means, and over said fourth and sixth clutch means.

15. An automatic change-speed and torque transmission as set forth in claim 14, wherein the inclination of said second set of surfaces on the teeth of said fifth clutch means is different from the inclination of the second set of surfaces on the teeth of said sixth clutch means.

16. An automatic change-speed and torque transmission comprising, in combination; rotatable input means having an axis of rotation; a three-component planet assembly the first component of which consists of sun wheel means, the second component of which consists of ring gear means coaxially surrounding said sun wheel means, and the third component of which consists of planet carrier means and planet wheel means, said planet wheel means disposed between and meshing with said sun wheel means and said ring gear means, said planet carrier means and said ring gear means slidable in the axial directions of and coaxial with said input means; shifting means coaxial with said input means and axially slidable with respect thereto; means for drivingly connecting said shifting means with said input means; resilient means for constantly urging said shifting means toward said planet assembly; first deflecting clutch means comprising a toothed member connected for rotation with said shifting means and another toothed member connetced for rotation with said carrier means, each of said members having teeth with surfaces inclined relative to the plane passing through the axis of said input means and normally engaging by the action of said resilient means to transmit torque up to a first magnitude from said shifting means to said carrier means, the inclination of said surfaces being such that said members become separated when the torque conveyed by said shifting means exceeds said magnitude whereby said resilient means is compressed and said shifting means is axially displaced with respect to said carrier means and said input means; first overrunning clutch means comprising a first portion connected for rotation with said shifting means and a second portion rotatable by said first portion when the members of said first deflecting clutch means are separated; first permanently engaging clutch means comprising a first member conected for rotation with the second portion of said first overrunning clutch means and a second member connected for rotation with said ring gear means, said first and said second member each having steep threads with a first set of surfaces parallel with the plane passing through the axis of said input means for transmitting rotation from said first to said second member and so positioned as to engage with each other when the members of said first deflecting clutch means are engaged, and a second set of surfaces inclined with respect to said plane and engaging when the members of said first deflecting clutch means are separated, the engagement of said second set of surfaces being such that the steep threads maintain the members of said first deflecting clutch means in separated position when the torque transmitted by said shifting means exceeds said first magnitude; rotatable output means coaxial with said input means; second deflecting clutch means comprising a toothed member connected for rotation with said ring gear means and another toothed member connected for rotation with said output means, each of said last mentoined two members having teeth with surfaces inclined relative to the plane passing through the axis of said input means and normally engaging by the action of said resilient means acting thereagainst over said shifting means and said planet assembly to transmit torque up to a second magnitude from said ring gear means to said output means, said second magnitude being higher than said first magnitude, the inclination of said last mentioned surfaces being such that said last mentioned members become automatically separated when the torque conveyed by said ring gear means exceeds said second magnitude whereby said resilient means is further compressed and said ring gear means is axially displaced with respect to said output means and said input means together with said shifting means; second overrunning clutch means comprising a first portion connected for rotation with said carrier means and a second portion rotatable by said first portion when the members of said second deflecting clutch means are separated; and second permanently engaging clutch means comprising a first member connected for rotation with the second portion of said second overrunning clutch means and a second member connected for rotation with said output means, said two last mentioned members each having steep threads with a first set of surfaces parallel with the plane passing through the axis of said input means for transmitting rotation from the first to the second member of said second permanently engaging clutch means and so positioned as to engage with each other when the members of said second deflecting clutch means are engaged, and a second set of surfaces inclined with respect to said plane and engaging when the members of said second deflecting clutch means are separated, the engagement of said last mentioned set of surfaces being such that the steep threads of said second permanently engaging clutch means maintain the members of said second deflecting clutch means in separated position when the torque transmitted by said ring gear means exceeds said second magnitude, the transmission operating in such manner that when said input means is rotated and the torque transmitted by said shifting means is below said first magnitude the output means is rotated over said first deflecting clutch means, said carrier means, said ring gear means and said second deflecting clutch means whereas, when the torque exceeds said first magnitude the output means is rotated by said shifting means over said first overrunning clutch means, said first permanently engaging clutch means, said ring gear means and said second deflecting clutch means and, when the torque exceeds said second magnitude the output means is rotated by said shifting means over said first overrunning clutch means, said first permanently engaging clutch means, said ring gear means, said carrier means, said second overrunning clutch means and said second permanently engaging clutch means.

17. An automatic change-speed and torque transmission comprising, in combination: rotatable input means having an axis of rotation; a three-component planet assembly the first component of which consists of sun wheel means, the second component of which consists of ring gear means coaxially surrounding said sun wheel means, and the third component of which consists of planet carrier means and planet wheel means, said planet wheel means disposed between and meshing with said sun wheel means and said ring gear means, said planet carrier means and said ring gear means slidable in the axial directions of and coaxial with said input means; shifting means coaxial with said input means and axially slidable with respect thereto; means for drivingly connecting said shifting means with said input means; resilient means for constantly urging said shifting means toward said planet assembly; first deflecting clutch means comprising a toothed member connected for rotation with said shifting means and another toothed member connected for rotation with said carrier means, each of said members having teeth with surfaces inclined relative to the plane passing through the axis of said input means and normally engaging by the action of said resilient means to transmit torque up to a first magnitude from said shifting means to said carrier means, the inclination of said surfaces being such that said members become separated when the torque conveyed by said shifting means exceeds said magnitude whereby said resilient means is compressed and said shifting means is axially displaced with respect to said carrier means and said input means; first friction clutch means comprising a first portion connected for rotation with said shifting means and a second portion rotatable by said first portion when the members of said first deflecting clutch means are separated; first permanently engaging clutch means comprising a first member connected for rotation with the second portion of said first friction clutch means and a second member connected for rotation with said ring gear means, said first and said second member each having steep threads with a first set of surfaces parallel with the plane passing through the axis of said input means for transmitting rotation from said first to said second member and so positioned as to engage with each other when the members of said first deflecting clutch means are engaged, and a second set of surfaces inclined with respect to said plane and engaging when the members of said first deflecting clutch means are separated, the engagement of said second set of surfaces being such that the steep threads maintain the members of said first deflecting clutch means in separated position when the torque transmitted by said shifting means exceeds said first magnitude; rotatable output means coaxial with said input means; second deflecting clutch means comprising a toothed member connected for rotation with said ring gear means and another toothed member connected for rotation with said output means, each of said last mentioned two members having teeth with surfaces inclined relative to the plane passing through the axis of said input means and normally engaging by the action of said resilient means acting thereagainst over said shifting means and said planet assembly to transmit torque up to a second magnitude from said ring gear means to said output means, said second magnitude being higher than said first magnitude, the inclination of said last mentioned surfaces being such that said last mentioned members become automatically separated when the torque conveyed by said ring gear means exceeds said second magnitude whereby said resilient means is further compressed and said ring gear means is axially displaced with respect to said output means and said input means together with said shifting means; second friction clutch means comprising a first portion connected for rotation with said carrier means and a second portion rotatable by said first portion when the members of said second deflecting clutch means are separated; and second permanently engaging clutch means comprising a first member connected for rotation with the second portion of said second friction clutch means and a second member connected for rotation with said output means, said two last mentioned members each having steep threads with a first set of surfaces parallel with the plane passing through the axis of said input means for transmitting rotation from the first to the second member of said second permanently engaging clutch means and so positioned as to engage with each other when the members of said second deflecting clutch means are engaged, and a second set of surfaces inclined with respect to said plane and engaging when the members of said second deflecting clutch means are separated, the engagement of said last mentioned set of surfaces being such that the steep threads of said second permanently engaging clutch means maintain the members of said second deflecting clutch means in separated position when the torque transmitted by said ring gear means exceeds said second magnitude, the transmission operating in such manner that when said input means is rotated and the torque transmitted by said shifting means is below said first magnitude the output means is rotated over said first deflecting clutch means, said carrier means, said ring gear means and said second deflecting clutch means whereas, when the torque exceeds said first magnitude the output means is rotated by said shifting means over said first friction clutch means, said first permanently engaging clutch means, said ring gear means and said second deflecting clutch means, and, when the torque exceeds said second magnitude the output means is rotated by said shifting means over said first friction clutch means, said first permanently engaging clutch means, said ring gear means, said carrier means, said second friction clutch means and said second permanently engaging clutch means.

18. An automatic change-speed and torque transmission comprising, in combination: rotatable input means having an axis; shifting means connected for rotation with said input means and axially slidable with respect thereto; resilient means for constantly urging said shifting means in one axial direction of said input means; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, each two of said components having different speed transmission ratios; said shifting means and one of said components defining two halves of first clutch means normally engaging under the action of said resilient means, said halves having teeth with a first set of surfaces so inclined as to transmit torque below a fixed magnitude from said input means over said shifting means to said one component and to automatically separate said halves against the force of said resilient means when the torque transmitted by said shifting means exceeds said magnitude, and a second set of surfaces so inclined as to transmit torque from said one component to said shifting means while the first clutch means is operative and said one component drives said shifting means; second clutch means between said shifting means and another of said components for connecting said other component with said shifting means when the halves of said first clutch means are separated; and rotatable output means connected with said other component, the transmission operating in such manner that, when the shifting means is connected with said one component the output means rotates at a speed proportional to the transmission ratio between said one and said other component whereas, when the shifting means is connected to said other component the shifting means and the output means rotate at the one-to-one ratio and, when said output means drives said planet assembly the shifting means is rotated by said first clutch means over said second set of surfaces.

19. An automatic change-speed and torque transmission comprising, in combination: rotatable input means having an axis of rotation; shifting means connected for rotation with and axially movable relative to said input means; at least one planet assembly coaxial with said input means, said assembly comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said carrier means being axially movable with respect to said input means together with said planet wheel means and said ring gear means; resilient means for constantly urging said shifting means toward said planet assembly; first clutch means between said shifting means and said carrier means comprising a pair of halves having teeth with a first set of surfaces so inclined as to normally engage by the action of said resilient means whereby to transmit torque up to a fixed magnitude from said shifting means to said carrier means, and to separate said halves against the force of said resilient means when the torque exceeds said magnitude, and a second set of surfaces so inclined as to engage when torque is transmitted from said carrier means to said shifting means; second clutch means between said shifting means and said ring gear means for drivingly connecting same when the halves of said first clutch means are separated; rotatable output means coaxial with said input means; third clutch means between said ring gear means and said output means comprising two halves having teeth with a first set of surfaces so inclined as to normally engage under the action of said resilient means over said shifting means and said ring gear means for transmitting torque up to a fixed magnitude higher than said first mentioned magnitude, and to separate said last mentioned halves when the torque exceeds said higher magnitude, and a second set of surfaces so inclined as to engage when torque is transmitted from said output means to said ring gear means; and fourth clutch means between said carrier means and said output means for drivingly connecting same when the halves of said third clutch means are separated, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said ring gear means, said carrier means and said fourth clutch means while, if said output means drives said shifting means torque is transmitted to said shifting means over the second set of surfaces of said third clutch means, over said ring gear means and said carrier means, and over the second set of surfaces of said first clutch means.

20. An automatic change-speed and torque transmission comprising, in combination: rotatable input means having an axis; shifting means connected for rotation with said input means and axially slidable with respect thereto; resilient means for constantly urging said shifting means in one axial direction of said input means; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, two of said components being slidable in the axial directions of said input means and each two of said components having different speed transmission ratios; said shifting means and one of said slidable components defining two halves of a first clutch means normally engaging under the action of said resilient means, said halves having teeth with a first set of surfaces so inclined as to transmit torque below a fixed magnitude from said input means over said shifting means to said one component and to automatically separate said halves against the force of said resilient means when the torque transmitted by said shifting means exceeds said magnitude, and a second set of surfaces so inclined as to transmit torque in a direction opposed to that of said first set of surfaces; second clutch means between said shifting means and the other of said slidable components for connecting said other component with the shifting means when said halves are separated; rotatable output means; third clutch means disposed between said output means and said other component comprising two spring biased halves having teeth with a first set of surfaces so inclined as to normally engage and transmit torque below a fixed magnitude greater than said first mentioned magnitude, and to separate said halves when the torque between said last mentioned halves exceeds said higher magnitude, and a second set of surfaces so inclined as to transmit torque in a direction opposed to that of said last mentioned set of surfaces; and fourth clutch means between said one component and said output means so installed as to connect same when the halves of said third clutch means are separated, the transmission operating in such manner that, when the shifting means transmits torque below said first mentioned magnitude, the output means is rotated over said one component, said other component and said third clutch means at a speed different from the speed of said input means; when the shifting means transmits torque above said first mentioned but below said last mentioned magnitude, the output means is rotated at one-to-one ratio over said other component and said third clutch means; and when said shifting means transmits torque greater than said last mentioned magnitude, the output means is rotated over said second clutch means, said other component and said fourth clutch means again at a speed different than the speed of said input means; whereas if the output means drives said shifting means torque is transmitted to the latter over the second set of surfaces of said third clutch means to said other component and said one component, and over the second set of surfaces of said first clutch means.

21. In a conveyance having a driven wheel, an axle, a hub fixed to said wheel and rotatable about said axle, a driving sprocket rotatable about said axle, and means for rotating said sprocket, an automatic change-speed and torque transmission comprising, in combination; a driving bushing rotatable about said axle; means for connecting said bushing with said sprocket for rotation therewith in at least one direction; shifting means coaxial with said bushing and connected for rotation therewith, said shifting means being axially slidable with respect to said bushing; a planet assembly coaxial with said hub, said assembly comprising sun wheel means fixed to said axle, planet carrier means rotatable about said sun wheel means, ring gear means rotatable about said carrier means and connected with said hub for rotation therewith in at least one direction, and planet wheel means rotatably supported by said carrier means and meshing with said sun wheel means and with said ring gear means, respectively; resilient means having a first end abutting against and constantly urging said shifting means in a direction toward said planet assembly, and a second end; an externally threaded member fixed to said axle in the proximity of the second end of said resilient means; an internally threaded member mounted on said externally threaded member and abutting against the second end of said resilient means; said carrier means and said shifting means constituting two halves of first deflecting clutch means having teeth with surfaces so inclined as to transmit torque and rotation from said shifting means to said carrier means when the torque is below a fixed magnitude and to automatically separate said halves when the torque exceeds said magnitude; and second clutch means between said ring gear means and said shifting means for rotatably connecting same when the halves of said first clutch means are separated, the transmission operating in such manner that, when the sprocket is driven in a direction to rotate said bushing and said shifting means whereby the latter transmits to said carrier means torque below said magnitude the ring gear means rotates said hub at a speed proportional to the transmission ratio between said carrier means and said ring gear means and, when the torque exceeds said magnitude the second clutch means rotates the ring gear means and the hub at the speed of said shifting means.

22. An automatic change-speed and torque transmission comprising, in combination: rotatable input means having an axis of rotation; shifting means connected for rotation with and axially movable relative to said input means; at least one planet assembly coaxial with said input means, said assembly comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said carrier means being axially movable with respect to said input means together with said planet wheel means and said ring gear means; resilient means for constantly urging said shifting means toward said planet assembly; hydraulic means for varying the tension of said resilient means; first clutch means between said shifting means and said carrier means comprising a pair of halves having teeth with surfaces so inclined as to normally engage by the action of said resilient means whereby to transmit torque up to a fixed magnitude from said shifting means to said carrier means, and to separate said halves against the force of said resilient means when the torque exceeds said magnitude; second clutch means between said shifting means and said ring gear means for drivingly connecting same when the halves of said first clutch means are separated; rotatable output means coaxial with said input means; third clutch means between said ring gear means and said output means comprising two halves having teeth with surfaces so inclined as to normally engage under the action of said resilient means over said shifting means and said ring gear means for transmitting torque up to a fixed magnitude higher than said first mentioned magnitude, and to separate said last mentioned halves when the torque exceeds said higher magnitude; and fourth clutch means between said carrier means and said output means for drivingly connecting same when the halves of said third clutch means are separated, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said ring gear means, said carrier means and said fourth clutch means.

23. An automatic change-speed and torque transmission comprising, in combination: rotatable input means having an axis; shifting means connected for rotation with said input means and axially slidable with respect thereto; resilient means for constantly urging said shifting means in one axial direction of said input means; hydraulic means for varying the tension of said resilient means; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, two of said components being slidable in the axial directions of said input means and each two of said components having different speed transmission ratios; said shifting means and one of said slidable components defining two halves of a first clutch means normally engaging under the action of said resilient means, said halves having teeth with surfaces so inclined as to transmit torque below a fixed magnitude from said input means over said shifting means to said one component and to automatically separate said halves against the force of said resilient means when the torque transmitted by said shifting means exceeds said magnitude; second clutch means between said shifting means and the other of said slidable components for connecting said other component with the shifting means when said halves are separated; rotatable output means; a connection between said output means and said hydraulic means for operating the latter in such manner that the tension of said resilient means varies in proportion with the rotational speed of said output means; third clutch means disposed between said output means and said other component comprising two spring biased halves having teeth with surfaces so inclined as to normally engage and transmit torque below a fixed magnitude greater than said first mentioned magnitude, and to separate said halves when the torque between said last mentioned halves exceeds said higher magnitude; and fourth clutch means between said one component and said output means so installed as to connect same when the halves of said third clutch means are separated, the transmission operating in such manner that, when the shifting means transmits torque below said first mentioned magnitude, the output means is rotated over said one component, said other component and said third clutch means at a speed different from the speed of said input means; when the shifting means transmits torque above said first mentioned but below said last mentioned magnitude, the output means is rotated at one-to-one ratio over said other component and said third clutch means; and when said shifting means transmits torque greater than said last mentioned magnitude, the output means is rotated over said second clutch means, said other component and said fourth clutch means again at a speed different than the speed of said input means.

24. An automatic change-speed and torque transmission comprising, in combination: rotatable input means having an axis of rotation; at least one three-component planet assembly the first component of which consists of sun wheel means coaxial with said input means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, said carrier means and said ring gear means being slidable in axial directions of said input means; shifting means connected for rotation with said input means and axially slidable with respect thereto; resilient means for constantly urging the shifting means toward said planet assembly; means for adjusting the tension of said resilient means; first clutch means comprising a first and a second toothed member connected for rotation with said shifting means and with said carrier means, respectively, said members having complementary teeth with surfaces so inclined as to maintain said members in mesh by the force of said resilient means up to a fixed magnitude of torque transmitted from said shifting means to said carrier means and to separate said members against the force of said resilient means when the torque exceeds said magnitude; overrunning clutch means comprising a first member fixed to said shifting means and a second member; third clutch means comprising a first toothed member fixed to the second member of said overrunning clutch means and a second toothed member fixed to said ring gear means, said last mentioned two toothed members having a first set of surfaces for transmitting rotation when the toothed members of said first clutch means are engaged, and a second set of surfaces inclined with respect to said plane, said second set of surfaces engaging with each other and maintaining said shifting means in a fixed axial position against the force of said resilient means when the members of said first clutch means are separated; and output means rotatably connectable with said ring gear means and said carrier means, the transmission operating in such manner that, when the members of said first clutch means are engaged the shifting means rotates said carrier means and thereover said ring gear means whereas, when the members of said first clutch means are separated the shifting means rotates said carrier means over said overrunning clutch means, said third clutch means and said ring gear means whereby said second set of surfaces maintains the members of said first clutch means separated while the torque transmitted from said shifting means to said carrier means exceeds said magnitude.

25. In an automotive vehicle, an automatic change-speed and torque transmission comprising, in combination: rotatable input means having an axis; shifting means coaxial and connected for rotation with said input means, said shifting means being axially movable with respect to said input means; at least one planet assembly coaxial with said input means and comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said ring gear means and said carrier means with said planet wheel means being movable in the axial directions of said input means; resilient means having one end abutting against said shifting means for constantly urging the latter toward said planet assembly, and a second end; first clutch means between said shifting means and said carrier means comprising a pair of halves having teeth with surfaces so inclined as to normally engage by the action of said resilient means whereby to transmit torque up to a fixed magnitude from said shifting means to said carrier means, and to separate said halves against the force of said resilient means when the torque exceeds said magnitude; second clutch means between said shifting means and said ring gear means for drivingly connecting same when the halves of said first clutch means are separated; rotatable output means coaxial with said input means; third clutch means between said ring gear means and said output means comprising two halves having teeth with surfaces so inclined as to normally engage under the action of said resilient means acting over said shifting means and said ring gear means whereby to transmit torque up to a fixed magnitude higher than said first mentioned magnitude, and to separate said last mentioned halves when the torque exceeds said higher magnitude; fourth clutch means between said carrier means and said output means for connecting same when the halves of said third clutch means are separated; piston means abutting against the second end of said resilient means and reciprocable in the axial directions of said output means; cylinder means for said piston means; first and second stop means for limiting the axial movements of said piston means in said cylinder means; said cylinder means defining a pressure chamber; a supply of pressure fluid; and means for introducing fluid into said pressure chamber whereby to move said piston means toward one of said stop means in a direction to compress said resilient means, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said ring gear means, said carrier means and said fourth clutch means.

26. An automatic change-speed and torque transmission comprising, in combination: rotatable input means; shifting means connected for rotation with said input means; at least one three-component planet assembly the first component of which consists of sun wheel means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means; spring biased deflecting clutch means between said shifting means and one of said components, said clutch means having a first position in which it connects said shifting means with said one component when the torque transmitted by said input means to said one component is below a fixed magnitude, and a second position in which it releases said shifting means from said one component when the torque exceeds said magnitude; means for locking the deflecting clutch means in said first position; second clutch means between said shifting means and another of said components so installed as to connect said shifting means with said other components when said deflecting clutch means is in said second position; rotatable output means; and means for connecting said output means with a selected component, the transmission operating in such manner that, when the shifting means is connected to a component other than the component connected with said output means the latter is rotated at a speed proportional to the transmission ratio of said last mentioned components whereas, if said shifting means and said output means are connected to the same component the output means is rotated at the speed of said shifting means.

27. An automatic change-speed and torque transmission comprising, in combination: rotatable input means having an axis of rotation; shifting means connected for rotation with and axially movable relative to said input means; at least one planet assembly coaxial with said input means, said assembly comprising planet carrier means, sun wheel means, ring gear means, and planet wheel means rotatably supported by said carrier means and meshing with said ring gear means and with said sun wheel means, respectively, the speed transmission of said planet wheel means between said carrier means and said ring gear means being at a step-up ratio, said carrier means being axially movable with respect to said input means together with said planet wheel means and said ring gear means; resilient means for constantly urging said shifting means toward said planet assembly; first clutch means between said shifting means and said carrier means comprising a pair of halves having teeth with surfaces so inclined as to normally engage by the action of said resilient means whereby to transmit torque up to a fixed magnitude from said shifting means to said carrier means, and to separate said halves against the force of said resilient means when the torque exceeds said magnitude; second clutch means between said shifting means and said ring gear means for drivingly connecting same when the halves of said first clutch means are separated; rotatable output means coaxial with said input means; third clutch means between said ring gear means and said output means comprising two halves having teeth with surfaces so inclined as to normally engage under the action of said resilient means over said shifting means and said ring gear means for transmitting torque up to a fixed magnitude higher than said first mentioned magnitude, and to separate said last mentioned halves when the torque exceeds said higher magitude; locking means for maintaining the halves of said third clutch means in a position in which said halves engage; and fourth clutuch means between said carrier means and said output means for drivingly connecting same when the halves of said third clutch means are separated, the transmission operating in such manner that, when the torque transmitted from said shifting means to said carrier means is below said first mentioned magnitude the output means is rotated by said ring gear means at a stepped-up ratio whereas, when the halves of said first clutch means are separated the second clutch means rotates said ring gear means and said output means at one-to-one ratio over said third clutch means and, when the halves of said third clutch means are separated said shifting means rotates said output means at a stepped-down ratio over said second clutch means, said ring gear means, said carrier means and said fourth clutch means.

28. An automatic change-speed and torque transmission comprising, in combination: rotatable input means having an axis of rotation; a three component planet assembly the first component of which consists of sun wheel means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means, said planet carrier means and said ring gear means slidable in the axial directions of and coaxial with said input means; shifting means coaxial with said input means and axially slidable with respect thereto; means for drivingly connecting said shifting means with said input means; resilient means for constantly urging said shifting means toward said planet assembly; first deflecting clutch means comprising a toothed member connected for rotation with said shifting means and another toothed member connected for rotation with said carrier means, each of said members having teeth with a first set of surfaces inclined relative to the plane passing through the axis of said input means and normally engaging by the action of said resilient means to transmit torque up to a first magnitude from said shifting means to said carrier means, the inclination of said surfaces being such that said members become separated when the torque conveyed by said shifting means exceeds said magnitude whereby said resilient means is compressed and said shifting means is axially displaced with respect to said carrier means and said input means, said teeth having a second set of surfaces so inclined as to transmit torque from said carrier means to said shifting means; first overrunning clutch means comprising a first portion connected for rotation with said shifting means and a second portion rotatable by said first portion when the members of said first deflecting clutch means are separated; first permanently engaging clutch means comprising a first member connected for rotation with the second portion of said first overrunning clutch means and a second member connected for rotation with said ring gear means, said first and said second member each having steep threads with a first set of surfaces parallel with the plane passing through the axis of said input means for transmitting rotation from said first to said second member and so positioned as to engage with each other when the members of said first deflecting clutch means are engaged, and a second set of surfaces inclined with respect to said plane and engaging when the members of said first deflecting clutch means are separated, the engagement of said second set of surfaces being such that the steep threads maintain the members of said first deflecting clutch means in separated position when the torque transmitted by said shifting means exceeds said first magnitude; rotatable output means coaxial with said input means; second deflecting clutch means comprising a toothed member connected for rotation with said ring gear means and another toothed member connected for rotation with said output means, each of said last mentioned two members having teeth with one set of surfaces inclined relative to the plane passing through the axis of said input means and normally engaging by the action of said resilient means acting thereagainst over said shifting means and said planet assembly to transmit torque up to a second magnitude from said ring means to said output means, said second magnitude being higher than said first magnitude, the inclination of said last mentioned surfaces being such that said last mentioned members become automatically separated when the torque conveyed by said ring gear means exceeds said second magnitude whereby said resilient means is further compressed and said ring gear means is axially displaced with respect to said output means and said input means together with said shifting means, said last mentioned teeth having another set of surfaces so inclined as to transmit torque from said output means to said ring gear means; means for locking said last mentioned teeth in a position in which said last mentioned set of surfaces transmits torque from said output means to said ring gear means; second overrunning clutch means comprising a first portion connected for rotation wtih said carrier means and a second portion rotatable by said first portion when the members of said second deflecting clutch means are separated; and second permanently engaging clutch means comprising a first member connected for rotation with the second portion of said second overrunning clutch means and a second member connected for rotation with said output means, said two last mentioned members each having steep threads with a first set of surfaces parallel with the plane passing through the axis of said input means for transmitting rotation from the first to the second member of said second permanently engaging clutch means and so positioned as to engage with each other when the members of said second deflecting clutch means are engaged, and a second set of surfaces inclined with respect to said plane and engaging when the members of said second deflecting clutch means are separated, the engagement of said last mentioned set of surfaces being such that the steep threads of said second permanently engaging clutch means maintained the members of said second deflecting clutch means in separated position when the torque transmitted by said ring gear means exceeds said second magnitude, the transmission operating in such manner that when said input means is rotated and the torque transmitted by said shifting means is below said first magnitude the output means is rotated over said first deflecting clutch means, said carrier means, said ring gear means and said second deflecting clutch means whereas, when the torque exceeds said first magnitude the output means is rotated by said shifting means over said first overrunning clutch means, said first permanently engaging clutch means, said ring gear means and said second deflecting clutch means and, when the torque exceeds said second magnitude the output means is rotated by said shifting means over said first overrunning clutch means, said first permanently engaging clutch means, said ring gear means, said carrier means, said second overrunning clutch means and said second permanently engaging clutch means.

29. An automatic change-speed and torque transmission as set forth in claim 25, wherein the means for introducing fluid into said pressure chamber is a pump communicating with said source and with said cylinder means and driven by said output means.

30. An automatic change-speed and torque transmission as set forth in claim 29, wherein said pump has a suction side connected to said source and a pressure side, and further comprising conduit means connecting said pressure side with said chamber for delivering pressure fluid into said chamber whereby to move said piston means in a direction toward said one stop means when said output means rotates, and throttling means in said conduit means for controlling the flow of pressure fluid from the pressure side of said pump to said chamber whereby to control the tension of said resilient means.

31. An automatic change-speed and torque transmission comprising, in combination: rotatable input means; shifting means connected for rotation and coaxial with said input means; a plurality of drivingly connected and serially arranged three-component planet assemblies, the first component of each planet assembly consisting of sun wheel means coaxial with said input means, the second component of each planet assembly consisting of ring gear means coaxially surrounding the respective sun wheel means, and the third component of each planet assembly consisting of planet carrier means and planet wheel means rotatably mounted in said planet carrier means, said planet wheel means disposed between and meshing with the respective sun wheel means and ring gear means; spring-biased deflecting clutch means between said shifting means and one component of one of said assemblies, said clutch means comprising two halves one of which is in torque receiving association with said shifting means and the other of which is in torque transmitting association with said one component up to a fixed magnitude of torque, said halves having surfaces so inclined with respect to the plane passing through the axis of said input means as to automatically separate same when the torque exceeds said magnitude; second clutch means between said shifting means and another component of said one planet assembly so disposed as to connect said other component with the shifting means when the halves of said deflecting clutch means are separated; rotatable output means coaxial with said input means; and means for selectively connecting said output means with the components of another of said planet assemblies.

32. An automatic change-speed and torque transmission comprising, in combination: rotatable input means having an axis of rotation; shifting means connected for rotation with said input means and coaxial with the latter; a first and a second three-component planet assembly, the first component of each planet assembly consisting of sun wheel means coaxial with said input means, the second component of each planet assembly consisting of ring gear means coaxially surrounding the respective sun wheel means, and the third component of each planet assembly consisting of planet carrier means and planet wheel means rotatably mounted in said planet carrier means, said planet wheel means disposed between and meshing with the respective sun wheel means and ring gear means; first spring-biased deflecting clutch means between said shifting means and one component of said first assembly, said clutch means comprising two halves one of which is in torque receiving association with said shifting means and the other of which is in torque transmitting association with said one component up to a fixed magnitude of torque, said halves having surfaces so inclined with respect to the plane passing through the axis of said input means as to automatically separate same when the torque exceeds said magnitude; first clutch means between said shifting means and another component of said first assembly so disposed as to connect said other component with the shifting means when the halves of said first deflecting clutch means are separated; a driving connection between at least one component of said first assembly and at least one component of said second assembly; rotatable output means coaxial with said input means; second spring-biased deflecting clutch means between one component of said second assembly and said output means, said last mentioned clutch means comprising two halves one of which is in torque receiving association with said one component of the second assembly and the other of which is in torque transmitting association with said output means up to a fixed magnitude of torque higher than said first mentioned magnitude, said last mentioned halves having surfaces so inclined with respect to the plane passing through the axis of said input means as to automatically separate same when the torque exceeds said higher magnitude; and second clutch means between said output means and another component of said second assembly so disposed as to connect said last mentioned other component with said output means when the halves of said second deflecting clutch means are separated.

33. An automatic change speed and torque transmission comprising, in combination: rotatable input means; shifting means connected for rotation and coaxial with said input means; a plurality of drivingly connected and serially arranged three-component planet assemblies, said planet assemblies having a common first component constituted by sun wheel means coaxial with said input means and each of said planet assemblies comprising a second and a third component, the second component of each planet assembly consisting of ring gear means coaxially surrounding said sun wheel means, and the third component of each planet assembly consisting of planet carrier means and planet wheel means rotatably mounted in said planet carrier means, said planet wheel means disposed between said sun wheel means and the respective ring gear means; spring biased deflecting clutch means between said shifting means and one component of one of said planet assemblies, said clutch means comprising two halves one of which is in torque receiving association with said shifting means and the other of which is in torque transmitting association with said last mentioned component up to a fixed magnitude of torque, said halves having surfaces so inclined with respect to the plane passing through the axis of said input means as to automatically separate same when the torque exceeds said magnitude; second clutch means between said shifting means and another component of said one planet assembly so disposed as to connect said other component with the shifting means when the halves of said deflecting clutch means are separated; rotatable output means coaxial with said input means; and means for selectively connecting said output means with the components of another of said planet assemblies.

34. An automatic change speed and torque transmission comprising, in combination: rotatable input means; shifting means connected for rotation and coaxial with said input means; a plurality of drivingly connected and serially arranged three-component planet assemblies, said planet assemblies having a common first component constituted by sun wheel means coaxial with said input means and each of said planet assemblies comprising a second and a third component, the second component of each planet assembly consisting of ring gear means coaxially surrounding said sun wheel means, and the third component of each planet assembly consisting of planet carrier means and planet wheel means rotatably mounted in said planet carrier means, said planet wheel means disposed between said sun wheel means and the respective ring gear means; spring biased deflecting clutch means between said shifting means and one component of one of said planet assemblies, said clutch means comprising two halves one of which is in torque receiving association with said shifting means and the other of which is in torque transmitting association with said last mentioned component up to a fixed magnitude of torque, said halves having surfaces so inclined with respect to the plane passing through the axis of said input means as to automatically separate same when the torque exceeds said magnitude; means operatively connected with said deflecting clutch means for holding said halves against separation after said fixed magnitude of torque is exceeded; second clutch means between said shifting means and another component of said one planet assembly so disposed as to connect said other component with the shifting means when the halves of said deflecting clutch means are separated; rotatable output means coaxial with said input means; and means for selectively connecting said output means with the components of another of said planet assemblies.

35. An automatic change-speed and torque transmission comprising, in combination: rotatable input means having an axis; shifting means connected for rotation with said input means; intermediate means having an axis coinciding with the axis of said input means; at least one three-component planet assembly the first component of which consists of sun wheel means mounted on said intermediate means, the second component of which consists of ring gear means coaxially surrounding said sun wheel means, and the third component of which consists of planet carrier means and planet wheel means rotatably mounted in said planet carrier means, said planet wheel means disposed between and meshing with said sun wheel means and said ring gear means; spring biased deflecting clutch means between said shifting means and one of said components, said clutch means having a first position in which it connects said shifting means with said one component when the torque transmitted by said input means to said one component is below a fixed magnitude, and a second position in which it releases said shifting means from said one component when the torque exceeds said magnitude; second clutch means between said shifting means and another of said components so installed as to connect said shifting means with said other component when said deflecting clutch means is in said second position; rotatable output means coaxial with said intermediate means; and means for connecting said output means with a selected component, the transmission operating in such manner that, when said shifting means is connected to a component other than the component connected with said output means the latter is rotated at a speed proportional to the transmission ratio of said last mentioned components whereas, if said shifting means and said output means are connected to the same component the output means is rotated at the speed of said shifting means.

36. An automatic change-speed and torque transmission comprising, in combination: a rotatable input shaft having an axis and an end; shifting means connected for rotation with said input shaft; an intermediate shaft coaxial with said input shaft, said intermediate shaft having a first end rotatably received in the end of said input shaft and a second end; at least one three-component planet assembly the first component of which consists of sun wheel means mounted on said intermediate shaft, the second component of which consists of ring gear means coaxially surrounding said sun wheel means, and the third component of which consists of planet carrier means and planet wheel means rotatably mounted in said planet carrier means, said planet wheel means mounted between and meshing with said sun wheel means and said ring gear means; spring biased deflecting clutch means between said shifting means said one component when the torque transmitted by said first position in which it connects said shifting means with said one component when the torque transmitted by said input shaft to said one component is below a fixed magnitude, and a second position in which it releases said shifting means from said one component when the torque exceeds said magnitude; second clutch means between said shifting means and another of said components so installed as to connect said shifting means with said other component when the deflecting clutch means is in said second position; a rotatable output shaft having an end rotatably receiving the second end of said intermediate shaft and coaxial therewith; and means for connecting said output shaft with a selected component, the transmission operating in such manner that, when said shifting means is connected to a component other than the component connected with said output shaft the latter is rotated at a speed proportional to the transmission ratio of said last mentioned components whereas, if said shifting means and said output shaft are connected to the same component the output shaft is rotated at the speed of said shifting means.

37. An automatic change-speed and torque transmission comprising, in combination: a rotatable input shaft having an axis, an end and a plurality of teeth adjacent to said end; shifting means connected for rotation with said input shaft; an intermediate shaft coaxial with said input shaft, said intermediate shaft having a first end rotatably received in the end of said input shaft, a plurality of teeth disposed adjacent to said first end, and a second end; at least one three-component planet assembly the first component of which consists of sun wheel means mounted on said intermediate shaft and having external teeth adjacent to the first end of said intermediate shaft, the second component of which consists of ring gear means coaxially surrounding said sun wheel means, and the third component of which consists of planet carrier means and planet wheel means rotatably mounted in said planet carrier means, said planet wheel means mounted between and meshing with said sun wheel means and said ring gear means; a sleeve coaxial with said input shaft and movable in the axial direction thereof, said sleeve having a first set of teeth permanently meshing with the teeth of said input shaft and a second set of teeth meshing with the teeth of said intermediate shaft in one position, with the teeth of said sun wheel means in another position, and being out of mesh with the teeth of said input shaft and of said sun wheel means in a third position of said sleeve; means for moving said sleeve into said three positions; spring biased deflecting clutch means between said shifting means and one of said components, said clutch means having a first position in which it connects said shifting means with said one component when the torque transmitted by said input shaft to said one component is below a fixed magnitude, and a second position in which it releases said shifting means from said one component when the torque exceeds said magnitude; second clutch means between said shifting means and another of said components so installed as to connect said shifting means with said other component when the deflecting clutch means is in said second position; a rotatable output shaft having an end rotatably receiving the second end of said intermediate shaft and coaxial therewith; and means for connecting said output shaft with a selected component, the transmission operating in such manner that, when said shifting means is connected to a component other than the component connected with said output shaft the latter is rotated at a speed proportional to the transmission ratio of said last mentioned components whereas, if said shifting means and said output shaft are connected to the same component the output shaft is rotated at the speed of said shifting means.

38. The structure as set forth in claim 37, further comprising brake means operatively connected with said sun wheel means; and means for actuating said brake means.

39. The structure as set forth in claim 37, further comprising brake means operatively connected with said planet carrier means; and means for actuating said brake means.

40. The structure as set forth in claim 37, further comprising first brake means operatively connected with said sun wheel means; second brake means operatively connected with said planet carrier means; and means for operating said first and said second brake means in such manner that one of said brake means is operative when the other of said brake means is inactive.

41. The structure as set forth in claim 37, further comprising means for maintaining the deflecting clutch means in said first position.

42. The structure as set forth in claim 37, further comprising manually operable means for maintaining said second clutch means in a position in which it connects said shifting means with said other component.

43. An automatic change-speed and torque transmission as set forth in claim 29, wherein said pump is connected for rotation with said output means in such manner as to urge pressure fluid into said chamber when said output means rotates in either direction.

44. An automatic change-speed and torque transmission as set forth in claim 30, further comprising automatic overflow valve means in said conduit means for controlling the pressure of fluid at the pressure side of said pump.

References Cited in the file of this patent

UNITED STATES PATENTS

| | | |
|---|---|---|
| 2,143,798 | Pike | Jan. 10, 1939 |
| 2,816,634 | Brown | Dec. 17, 1957 |
| 2,844,050 | Brendel | July 22, 1958 |